US012663243B2

(12) United States Patent
Taheri et al.

(10) Patent No.: US 12,663,243 B2
(45) Date of Patent: Jun. 23, 2026

(54) MULTIFUNCTION PORTABLE ILLUMINATION SYSTEM

(71) Applicant: IMMOBILEYES INC., Kent, OH (US)

(72) Inventors: Bahman Taheri, Shaker Heights, OH (US); Atossa Alavi, Shaker Heights, OH (US)

(73) Assignee: IMMOBILEYES INC., Kent, OH (US)

( * ) Notice: Subject to any disclaimer, the term of this patent is extended or adjusted under 35 U.S.C. 154(b) by 0 days.

(21) Appl. No.: 18/872,075

(22) PCT Filed: Jun. 6, 2023

(86) PCT No.: PCT/US2023/024503
§ 371 (c)(1),
(2) Date: Dec. 5, 2024

(87) PCT Pub. No.: WO2023/239679
PCT Pub. Date: Dec. 14, 2023

(65) Prior Publication Data
US 2025/0327646 A1 Oct. 23, 2025

Related U.S. Application Data

(60) Provisional application No. 63/446,022, filed on Feb. 16, 2023, provisional application No. 63/349,183, filed on Jun. 6, 2022.

(51) Int. Cl.
*F41H 13/00* (2006.01)
*F21L 4/02* (2006.01)
*F21V 5/00* (2018.01)

(52) U.S. Cl.
CPC ............ *F41H 13/0087* (2013.01); *F21L 4/02* (2013.01); *F21V 5/004* (2013.01); *F41H 13/0056* (2013.01)

(58) Field of Classification Search
CPC .... F41H 13/0056; F41H 13/0087; F21L 4/02; F21L 4/022; F21L 4/025; F21L 4/027
See application file for complete search history.

(56) References Cited

U.S. PATENT DOCUMENTS 6,793,364 B2 * 9/2004 Cramer .................. F41A 33/02 362/112
7,347,582 B1 3/2008 Kung
(Continued)

FOREIGN PATENT DOCUMENTS

CN 211261970 U 8/2020
WO WO-2019222723 A1 * 11/2019 ......... F41H 13/0056

OTHER PUBLICATIONS

International Search Report from PCT Application No. PCT/US2023/024503 dated Dec. 14, 2023, 12 pages.
(Continued)

*Primary Examiner* — Alexander K Garlen
(74) *Attorney, Agent, or Firm* — Alavi IP

(57) ABSTRACT

A multifunction portable illumination system includes a housing having a power source. A broadband illumination source connected to the power source and capable of producing broadband illuminating light. The system includes an imaging disruption assembly including at least one narrow-band light source capable of generating one or more high intensity light beams (HILB) and a light modifying assembly configured to modify the one or more HILB to produce a Modified HILB. At least one Modified HILB may have the requisite irradiance to cause disruption of an imaging system.

27 Claims, 13 Drawing Sheets

(56) References Cited

U.S. PATENT DOCUMENTS

| | | | | |
|---|---|---|---|---|
| 7,794,102 | B2 * | 9/2010 | Shemwell | F41H 13/0087 362/112 |
| 7,827,726 | B2 | 11/2010 | Stokes | |
| 8,419,213 | B1 * | 4/2013 | Rubtsov | H05B 45/20 362/249.02 |
| 10,712,131 | B2 | 7/2020 | Poplawski | |
| 2005/0185403 | A1 * | 8/2005 | Diehl | F41H 13/0081 362/228 |
| 2006/0119483 | A1 * | 6/2006 | Rubtsov | F41H 13/0087 340/574 |
| 2006/0233215 | A1 * | 10/2006 | Casazza | F41H 13/0056 372/70 |
| 2007/0039226 | A1 * | 2/2007 | Stokes | F41G 1/35 42/146 |
| 2007/0159815 | A1 | 7/2007 | Bayat et al. | |
| 2008/0013311 | A1 * | 1/2008 | Rubtsov | H05B 45/32 362/231 |
| 2012/0314403 | A1 | 12/2012 | Kennedy et al. | |
| 2016/0377391 | A1 * | 12/2016 | Rubtsov | F21L 4/027 315/297 |
| 2017/0067605 | A1 * | 3/2017 | Kuo | F21L 4/027 |
| 2021/0215319 | A1 | 7/2021 | Raring et al. | |
| 2021/0239437 | A1 | 8/2021 | Taheri et al. | |
| 2022/0163297 | A1 | 5/2022 | Taheri et al. | |

OTHER PUBLICATIONS

Williamson et al., Nominal ocular dazzle distance (NODD), Applied Optics, vol. 54, No. 7, Mar. 1, 2015, pp. 1564-1572.

* cited by examiner

MULTIFUNCTION PORTABLE ILLUMINATION SYSTEM

CROSS-REFERENCE TO RELATED APPLICATIONS

This application is a U.S. National Stage Application under 35 U.S.C. § 371 of International Application No. PCT/US2023/024503 entitled MULTIFUNCTION PORTABLE ILLUMINATION SYSTEM, filed Jun. 6, 2023, which claims priority to, and any other benefit of, U.S. Provisional Patent Application Ser. No. 63/349,183 entitled PORTABLE ILLUMINATION SYSTEM, filed Jun. 6, 2022, and to U.S. Provisional Patent Application Ser. No. 63/446,022 entitled PORTABLE ILLUMINATION SYSTEM, filed Feb. 16, 2023, each of which is incorporated herein by reference in its entirety.

TECHNICAL FIELD

The following disclosure relates to portable illumination systems that include features to cause imaging disruption for security and protection purposes.

BACKGROUND

Portable lighting devices such as flashlights, weapon-mounted lights, etc. are critical tools for security personnel such as law enforcement officers, security guards, military staff, and the like. Besides providing the basic function of illumination, there has been a desire to include additional functionality into flashlights to eliminate or augment the need for persons to carry additional devices. In some cases, persons using the portable lighting devices may encounter dangerous situations or hostile threats from other persons, animals, or devices. Since the flashlight may already be in the person's hands, it would be desirable if it included functionality to meet or counteract the situation or threat.

Thus, there remains a desire for a portable illuminating device that includes a protective, defensive or safety capability in a form that is effective at countering threats and easy to use.

SUMMARY

The present disclosure includes a variety of aspects, which may be selected in different combinations based upon the particular application or needs to be addressed.

In accordance with some embodiments, a multifunction portable illumination system includes a housing having a power source. A broadband illumination source is connected to the power source and capable of producing broadband illuminating light. The system includes an imaging disruption assembly including at least one narrow-band light source capable of generating one or more high intensity light beams (HILB) and a light modifying assembly configured to modify the one or more HILB to produce a Modified HILB.

In accordance with some other embodiments, a multifunction portable illumination system includes a housing having a power source and at least one controller. A broadband illumination source is connected to the power source and capable of producing broadband illuminating light having a bandwidth of at least 100 nm. The system further includes a first narrow-band light source capable of generating a first high intensity light beam (HILB) having a bandwidth of less than 100 nm and a second narrow-band light source capable of generating a second HILB having a bandwidth of less than 100 nm. A light modifying assembly configured to modify the first and second HILBs to produce first and second Modified HILBs (MHILBs), wherein the first and second MHILBs are pulsed in a preprogrammed sequence.

DETAILED DESCRIPTION

Definitions

Figure 1A:
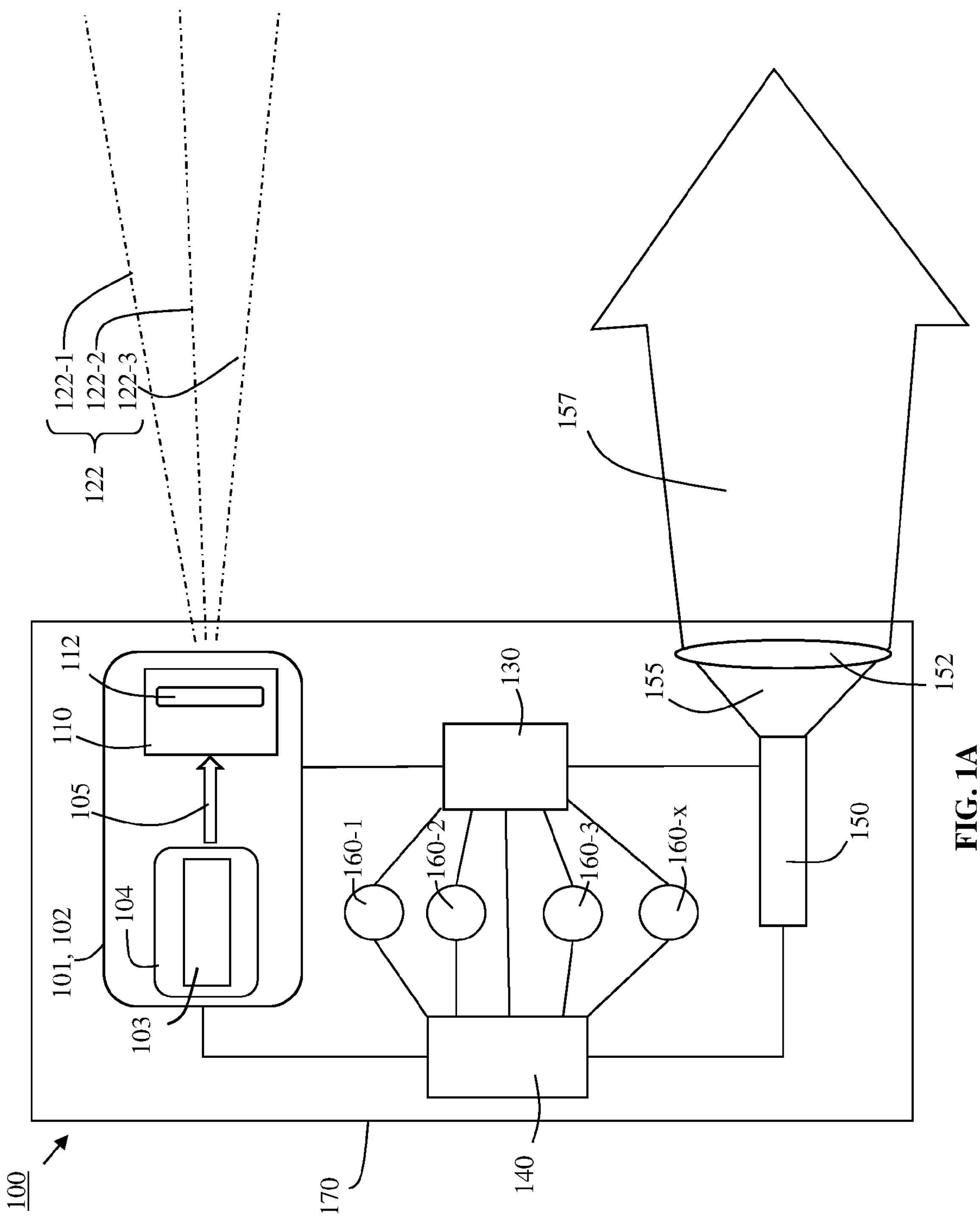
FIG. 1A is a schematic diagram illustrating a non-limiting example of an illumination system according to some embodiments.

Beam Array—two or more light beams emanating from one or more sources but having different spatial (direction/location), wavelength, divergence, duration or other optical properties. A Beam Array may be a spatial Multi-beam Array or a Temporal Beam Array. A Beam Array may be characterized as having an array pattern.

Beam Elements (BE)—the light beams that emerge from the OE in a beam array (e.g., 122-1, 122-2, 122-3, etc. in FIG. 1).

Beam Element Divergence or BED is the divergence of each beam element, which may be the same as, or different from, the divergence of other beam elements within the same beam array.

Disruptive Light is light capable of producing Effective Disruption.

Disruptive light source or narrow-band light source is a light source that produces a high intensity light beam (HILB).

High Intensity Light Beam (HILB) is the light beam emitted from the disruption light source. In some examples, the HILB has a bandwidth of less than 100 nm, or less than 50 nm.

HILB-D-Divergence of the High Intensity Light Beam (HILB) before it encounters the optical element (OE).

Imaging Disruption Assembly is an assembly of at least one HILB and a Light Modifying Assembly that can produce a Modified HILB capable of producing an Effective Disruption.

Intensity, or radiant intensity, is defined as the flux or power per unit solid angle emitted by an optical component into a given direction. Mathematically it can be expressed as $$I = \frac{d\Phi}{d\Omega}$$

where $d\Phi$ is the flux or power emitted into the solid angle $d\Omega$.

Irradiance is the radiant flux (power) received by a surface per unit area. The SI unit of irradiance is watt per square meter ($W/m^2$). Here, irradiance of a beam is often expressed as $mW/cm^2$.

LED is a Light Emitting Diode.

Light Modifying Assembly is an assembly of elements, such as Optical Elements (OE), motion elements (motors, etc.) and other elements capable of modifying an HILB to create a Modified HILB.

Modified HILB (MHILB)—refers to a modified light that emerges after being modified by the Light Modifying Assembly (LMA) and is designed to illuminate a Zone of Disruption and is capable of producing an Effective Disruption. Various modifications are contemplated including direction, refraction, diffraction, reflection, divergence, coherence, power, intensity or irradiance or any other modifications known in the art. A MD-HILB(s), a multibeam array(s), and a temporal beam array(s) are some non-limiting examples of MHILBs.

Modified Divergence HILB (MD-HILB)—refers to a high intensity light beam(s) (HILB) that emerge after being modified by a DMOE.

Multi-Beam or Spatial Beam Array—refers to an array or pattern of two or more separate light beams formed by separate light sources or by a multi-beam OE (MBOE, see below). The MBOE may, for example, include a diffractive OE, a microlens array OE, or some other beam splitting optical element.

Optical Element (OE)—an element that modifies an HILB such as to either i) create a Modified Divergence HILB such that the projected modified HILB covers an area or zone, hereinafter Zone of Disruption (ZOD), or ii) create a pattern of light or Beam Array characterized by two or more light array elements that are spatially or temporally separated, i.e. into a spatial or temporal array of beams (all collectively referred to as "Modified HILB"). In some examples, an OE may be characterized as a divergence-modifying OE ("DMOE"), or a multi-beam OE ("MBOE") or a light redirection OE ("LROE").

Portable—refers to a device that has its own power source (e.g., a battery, a capacitor, a fuel cell or the like), i.e., does not require mains for powering. It includes hand-held or "man-portable" devices or ones that can be mounted on tripods, stands and relocated from one location to another. In some embodiments, a portable illumination system of the present disclosure may weigh less than 50 kg, alternatively less than 10 kg, 5 kg, 2 kg, 1 kg, 0.7 kg, 0.5 kg, 0.4 kg, 0.3 kg, 0.2 kg, or 0.1 kg.

Temporal Beam Array or Pattern—an array or pattern of two or more MHILB light beams that are separated temporally. In some embodiments, a temporal beam array may be a Dynamic Temporal Array formed by redirecting a single light beam as function of time, e.g., by scanning or rastering the light. For example, the beam at first time $t_1$ has a first spatial property (first light beam) and the beam at a second time $t_2$ has a second spatial property (second light beam) that is different from the first spatial property. A Dynamic Temporal Beam array may be produced by moving the light source itself or by using an LROE. The LROE may, for example, include one or more moveable mirrors, moveable lenses, a micro-electromechanical systems (MEMS) element, or variable refractive index devices or the like. In other embodiments, a temporal beam array may be a Stationary Temporal Array formed by separating the light beams by alternating their illumination time to create a "flashing", "strobing" or "cameo" light effect, but without necessarily redirecting the light.

ZOD-Zone of Disruption—the region or envelope of space (zone) where the Modified HILB can be projected into or onto to effectively disrupt an imaging system (e.g., a visual or sensor imaging system). To "effectively disrupt" or Effective Disruption depends on the situation. In some cases, with respect to a visual imaging system, it may mean to at least cause a temporary distraction to a person or animal without causing permanent or severe eye damage. Some illuminance threshold data are shown in Table 1 below which are based on ANSI Z136.6 (American National Standards Institute, 2005).

TABLE 1

| Visual effect | Irradiance threshold ($W/cm^2$) | Illuminance threshold (lx) |
|---|---|---|
| Eye damage | $2.5 \times 10^{-3}$ | 17,000 |
| Afterimages, flash blindness | $1 \times 10^{-4}$ | 680 |
| Glare | $5 \times 10^{-6}$ | 34 |
| Startle, distraction | $5 \times 10^{-8}$ | 0.34 |

In some cases, with respect to a sensor imaging system, it may mean to at least temporarily cause the sensor to provide a signal that is incomplete, corrupted, or inaccurate in some way. In some cases, the Effective Disruption includes temporary visual impairment chosen from one of: startle, distraction, glare, dazzle, flash blindness, veiling luminescence, afterimage, lack of visual acuity, vision degradation, photosensitivity, vertigo, disorientation, photophobia or sensitivity to light, blinking, headaches, muscle spasms, or a combination thereof. In some cases, Effective Disruption includes "dazzle", meaning the degradation imposed on an imaging sensor, such as the human cyc, by direct illumination by Beam Element of a HILB light source. This "vision degradation" can refer to an eye-safe reduction of the visual contrast of a person's visual task or other visual disturbances.

The ZOD may have different dimensions depending on the use case, type of Effective Disruption sought, the modified HILB characteristics, and the type of HILB used. For example, in the case where a laser source is used to temporarily disrupt the vision of a person within the ZOD, the Modified HILB or Beam Array properties may be set with reference to temporary visual effects and parameters set out for eye-safety such as Nominal Ocular Hazard Distance (NOHD) and Maximum Permissible Exposure (MPE) or Nominal Ocular Dazzle Distance (NODD), Maximum Dazzle Exposure (MDE), Hazard Distance (HD) and/or the desired or particular visual effect (e.g., a ZOD may include the zone between the NOHD and a distance where the Effective Disruption or visual effect is no longer seen). For example, the MDE was introduced for quantifying the threshold laser irradiance below which a given target/object can be visually detected. The NODD was introduced to calculate the minimum distance from a laser system for the visual detection of a target/object. Williamson and McLin provide detailed description of NODD in APPLIED OPTICS, Vo. 54, No. 7, (Mar. 1, 2015), pp 1564-1572, the entire contents of which are incorporated by reference herein for all purposes.

The NOHD is the distance from the source at which the intensity or the energy per surface unit becomes lower than the Maximum Permissible Exposure (M.P.E.) on the cornea and on the skin. One or more laser safety standards may be used to calculate the cyc-safe distance, such as the NOHD defined by the American National Standard for Safe Use of Lasers (e.g., the most recent version of ANSI Z136.1 or similar standard), or the International Electrotechnical Commission (IEC) for safety of laser products (e.g., the most recent version of IEC 60825-1 or similar standard), and/or the International Commission for Non-Ionizing Radiation Protection (ICNIRP) guidelines. However, it is contemplated that other methods or formulae may be used to calculate the safe distance from source in order to ensure eye-safety using the devices contemplated herein, which may not be present in ANSI, IEC or ICNIRP standards today but may be calculated and accepted in due course. It is noted that different parameters apply to LED source safety and are also contemplated here.

Power as used herein refers to the output power of the light source and is the energy delivered per unit of time and may be expressed as watts (W) or milliwatts (mW). In the case of a pulsed light source such as a pulsed laser or pulsed LED, power can be the peak power or the average power as known in the art.

Portable Illumination System

Considered herein are various portable illumination devices and methods for using the same. In various embodiments, an illumination system may include a broadband illumination source and an imaging disruption assembly. The broadband illumination source may be used for area lighting to assist a user to observe an object, a person, a situation, an environment, or the like. The imaging disruption assembly may be used for security or protective purposes, e.g., as a defensive tool or non-lethal tool to cause disruption of a potential threat. Herein, the term "imaging disruption" generally refers to either or both the disruption of biological visual systems (which may include the eye of a human or animal and/or the processing of visual images in the brain of the human or animal) or the disruption of electronic sensors such as cameras or the like.

FIG. 1A is a schematic diagram illustrating a non-limiting example of an illumination system according to some embodiments. Illumination system 100 includes housing 170 which may act as physical support or structure to which or in which various other system elements may be attached. Illumination system 100 includes a broadband illumination source 150, which produces illumination light 155/155' to be projected onto an area for general illumination purposes. In some examples, illumination light 155 may be optionally further modified by optical component 152 to produce modified illumination light 157. Broadband illumination source 150 may be in electrical communication with, and powered by, power source 140.

Illumination system 100 further includes an imaging disruption assembly 101 that includes one or more high intensity light sources 103 for generating one or more High Intensity Light Beams (HILBs) 105. An imaging disruption assembly may be referred to herein as an imaging disruption device. The imaging disruption assembly further includes a light modifying assembly 110 for generating a beam array. In some embodiments, the light modifying assembly 110 may include at least one optical element ("OE") 112 to generate a Modified Divergence HILB (MD-HILB), or a Beam Array (using at least one MBOE, or LROE, or a combination). In some embodiments, a modified divergence OE (MDOE) may be a lens or reflective structure that modifies the light divergence. In some cases, a reflective structure may be a total-internal reflection (TIR) type of structure, a Fresnel lens, or any other optical lens that can modify divergence or beam shape. The light modifying assembly 110 may also include other elements, such as lenses, mirrors, a motor or other means of motion to move an OE, or a light source, or a combination thereof. In some cases (as shown here), the light modifying assembly 110 may be designed to only affect the HILB without affecting the broadband illumination source 150 or the illumination light 155. In some other embodiments (not shown in FIG. 1), the light modifying assembly may also act on the illumination light, e.g., the HILB source and broadband illumination source may in some cases be generally co-located (near to each other) so that a light modifying assembly acts on both the high intensity and illumination light.

In some embodiments, the light modifying assembly 110 acts on the HILB to produce a first beam array 122 made up of first array Beam Elements, e.g., 122-1, 122-2, and 122-3. The first array of beam elements may be projected into a Zone of Disruption ("ZOD"—not shown), for example, to disrupt the vision of a person who poses a threat to the user. Although FIG. 1A shows three light elements for the beam array, there may be as few as two or as many as tens, hundreds, or thousands of such beam elements depending on use-case requirements and the OE and HILB characteristics. In some embodiments, light source 103 may be provided on a stage 104, which may optionally be a moveable stage. In some embodiments, a moveable stage may form part of the light modifying assembly. One or more components of imaging disruption assembly 101 may optionally be provided in a secondary housing 102 that is attached to housing 170. Alternatively, some or all of the components of the imaging disruption assembly 101 may be attached directly to housing 170.

Figure 1B:
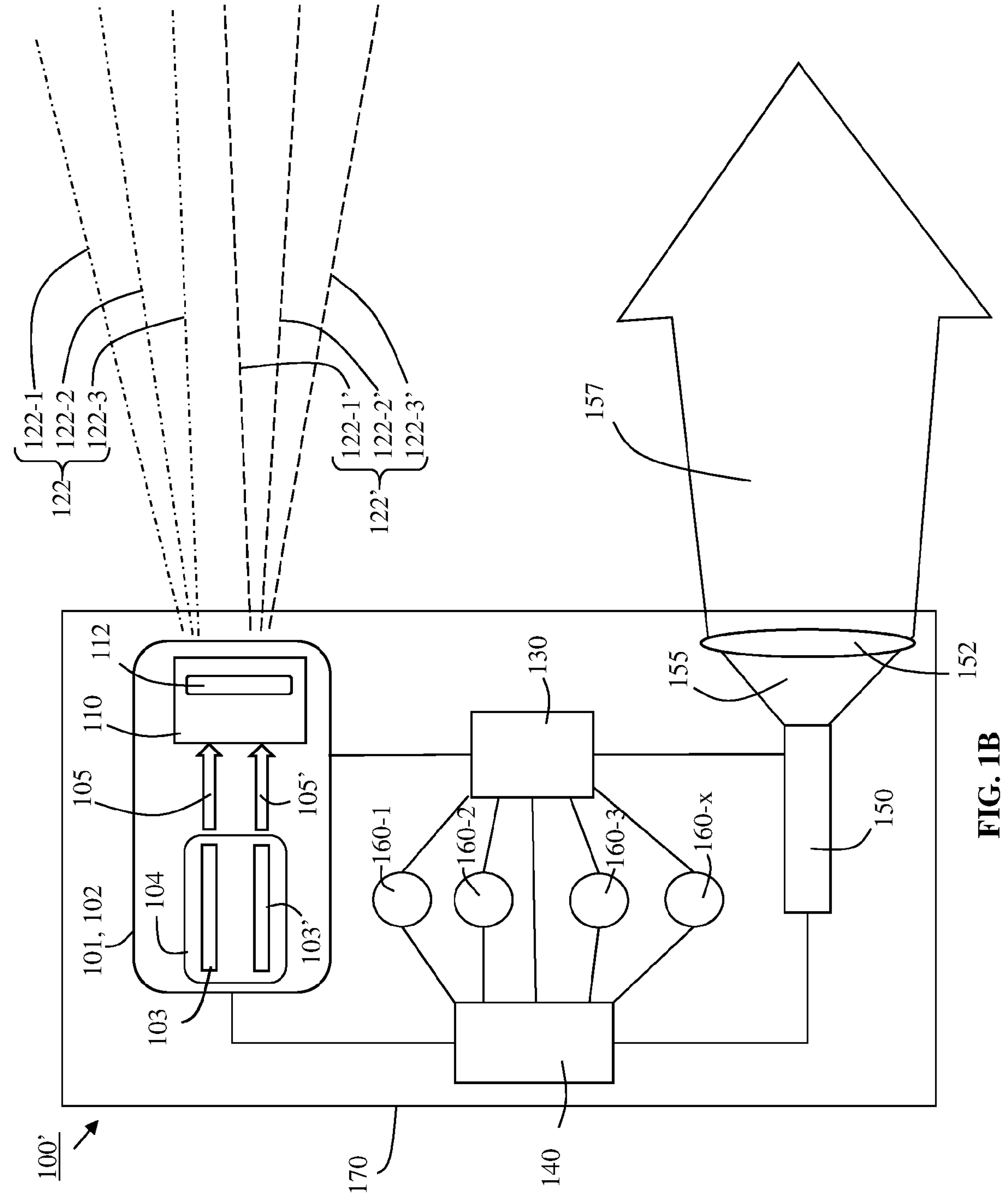
FIG. 1B is a schematic diagram illustrating a non-limiting example of an illumination system according to some embodiments.

In some embodiments, multiple light sources may be used to generate multiple HILBs and multiple beam arrays. FIG. 1B is similar to FIG. 1A, but illumination system 100' includes first and second light sources 103, 103' that generate first and second HILBs 105, 105'. OE element 112 (which could optionally include multiple OEs) may act on the first and second HILBs to produce modified HILBs in the form of first and second beam arrays or patterns 122, 122'.

In some embodiments, illumination system 100, 100' may include a controller 130 having circuitry for at least partially controlling the operation of one or more: high intensity light source 103, light modifying assembly 110 and any of its components (e.g., OE 112, a motor, etc.), power source 140, broadband illumination source 150, optical component 152, or one or more additional components 160, or any combination thereof. In some cases, controller 130 may also optionally act as a power supply to power to the light source 103, 103', light modifying assembly 110, broadband illumination source 150, optical component 152, or one or more additional components 160, instead of, or in addition to, power supplied by power source 140.

In some embodiments, the illumination system 100, 100' may include multiple power sources and/or multiple controllers for powering an/or controlling different features or sets of features of the system.

In some embodiments, illumination system 100, 100' may include one or more additional components 160, e.g., additional components 160-1, 160-2, 160-3 . . . 160-$x$, that may serve one or more other functions besides general illumination or imaging disruption as discussed elsewhere herein.

Broadband Illumination Source/Optical Component

In some cases, the broadband illumination source 150 may be a non-coherent light producing an illumination light 155 having a bandwidth of at least 100 nm, e.g., as measured by its full-width-at-half-maximum (FWHM) intensity profile. In some embodiments, the broadband illumination source (or illumination light) may appear white, having substantial emission from the red, green, and blue portions of the visible light spectrum. In some cases, white light may have a hue (which may be referred to herein as "near white" or "off white") where all three colors are present, but one or two colors is more or less prominent that the other(s). In some embodiments, the broadband illumination source may have a significant color and may be characterized as cyan, yellow, or magenta. In some embodiments, broadband illumination source 150 may include red-, green-, and blue-emitting LEDs or the like that may optionally be individually controllable so as to adjust color. In some cases, the FWHM of the broadband illumination light source may be calculated by summing the FWHMs for the individual LEDs, e.g., red-, green-, and blue-emitting LEDs. In such cases, the sum is at least 100 nm, but an individual LED may be less than 100 nm.

In some embodiments, the broadband illumination source 150 may include an incandescent lamp, a halogen lamp, a fluorescent lamp, a xenon lamp, an LED, a super-luminescent diode (SLD), a surface mounted LED, a micro-LED, or an LED- or laser-pumped phosphor. SLD or laser-pumped phosphor devices are sometimes referred to as "laser light" (e.g. Kyrocera LaserLight KSLD). Some examples may use Laser Diodes or LD's or high-power multimode blue edge-emitting laser diodes such as those described by S. Nakamura, S. Pearton and G. Fasol, "The Blue Laser Diode; the Complete Story", Springer, ISBN 3-540-66505-6, (2000). Any similar surface mounted light sources are contemplated and can serve as the broadband illumination source. The illumination system may include an illumination switch that may be used to activate the broadband illumination source 150 and illumination light 155. In some cases, the illumination switch may be provided on or within the housing 170. The switch may, for example, include a knob that is turned, a slidable button, a push button, a toggle, a ring that is twisted or turned, a trigger, or some other physical device accessible to the user. In some cases, a switch may be activated electronically, e.g., by a sound or voice, or by a wireless signal from another device. Engaging a switch may close a circuit that allows electricity to pass, e.g., from power supply 140 (and/or controller 130) to the broadband illumination source 150. The operation of broadband illumination source may in some cases be controlled (e.g., by controller 130, a switch, or some other component) to adjust brightness, on/off time, illumination mode (e.g., continuous or flashing), or the like. In some cases, the same switch that operates the broadband illumination source may also operate the disruption light source or the imaging disruption assembly. Although the broadband illumination source's primary function is to illuminate an area or object, in some embodiments, it may be used to cause visual disruption (typically at a lower level than the imaging disruption assembly is capable of) or enhance visual disruption in cooperation with the imaging disruption assembly.

In some cases, the optical component 152 may include one or more lenses, mirrors, reflectors, total internal reflection (TIR) elements, filters or any other element that may be desirable to create acceptable illumination. The optical component may shape or focus the beam of illumination light (e.g., change it from a wide beam to narrow beam or vice versa), redirect it, alter its brightness, or modify its color. In operation, optical component 152 (if present) may be fixed or permanent, or alternatively, it may be variable or adjustable in some way. In a non-limiting example, optical component 152 may include one or more lenses that may be moved relative to light source 150 or to each other, so that it reshapes the illumination light beam. Such movement may be made manually, e.g., by a user pushing a slide button, twisting a lens assembly head, or the like. Alternatively, such movement may be made electronically with the use of motors. Or in some cases, the index of refraction or shape of a lens element may be adjusted electronically (without necessarily moving the lens). In some embodiments (not shown), optical component 152 may also act as a light modifying assembly 110 on the HILB 105, for example when the disruption light source 103 and the illumination source 150 are approximately co-located.

Imaging Disruption Assembly

HILB

The disruption light source(s) 103 may produce one or more high intensity light beams (HILBs) 105. In some embodiments, the HILB may have a wavelength bandwidth less than 100 nm, alternatively less than 90, 80, 70, 60, 50, 40, 30, 20, 15, 10, 9, 8, 7, 6, 5, 4, 3, 2, or 1 nm. In some cases, bandwidth may correspond to a full-width-at-half-max (FWHM) of a spectrum of relative radiant power vs. wavelength. In some embodiments, a disruption light source may be one or more pulsed or continuous wave lasers. In some examples, a disruption light source may include one or more laser diodes, LEDs, micro-LEDs, superluminescent diodes (SLDs), surface-mounted diodes (SMDs), or laser- or LED-pumped phosphor devices (including but not limited to those described in US patent publication no. 2021/0215319). Alternatively, a disruption light source may be a xenon, mercury, or other high intensity lamp whose light output is sent through a color filter element to produce the desired bandwidth and optionally through collimating lenses. In some embodiments, a disruption light source may include a GaN-, GaAs-, or InP-based laser or diode. In some embodiments, the HILBs may be characterized as highly coherent. A combination of disruption light sources may optionally be used. In some embodiments, the light source can produce other non-intense light beams as well as intense light beams.

In some embodiments, the disruption light source can produce one or more light beams having a wavelength bandwidth of 100 nm or higher in addition to producing one or more light beams having a wavelength bandwidth of less than 100 nm. Any of the above light sources may optionally be pulsed.

In some embodiments, the HILB has a wavelength that is within the visible range of 400-700 nm ("visible light"), e.g., a blue light having a peak wavelength range 400-500 nm, a green light having a peak wavelength range of 500-580 nm, or a red light having a peak wavelength range 580-700 nm. In some embodiments, the HILB has a wavelength that is outside the visible range, e.g., an ultraviolet light having a peak wavelength range 300-400 nm or an infrared light having a peak wavelength range 700-1600, or 1600-3000 nm or greater in the infrared region. In some embodiments, the light source itself produces such wavelengths, but alternatively, the desired wavelength can be produced by up-converting or down-converting the light source light.

In some embodiments, two or more HILBs are produced by the light source(s) each having the same or different characteristics such as intensity, power, wavelengths, bandwidth, beam profile, beam divergence, etc. For example, infrared light may be used to produce beam arrays that deter a perpetrator using night vision goggles or similar imaging devices by overloading or confusing their infrared sensors. Visible light may be used to disrupt the visual system of a person or animal, or to disrupt or overload a conventional CCD or CMOS camera sensor. In some embodiments, the MHILBs may disrupt the ability of a sensor to accurately employ facial recognition technology or other image sensor systems. Ultraviolet light may also disrupt visual or electronic imaging systems. There is no particular limit to combinations. In some embodiments, the HILB may be coupled to optical components to assist in directing the light to an intended OE such as one or more lenses, mirrors, TIR elements, light guides or the like.

There is no particular limitation on the power of the HILB. In embodiments, the power may be in a range of less than 1 mW, 1-5 mW, 5-10 mW, 10-50 mW, 50-100 mW, 100-500 mW, 500 mW-1 W, 1-2 W, 2-3 W, 3-4 W, 4-5 W, 5-6 W, 6-7 W, 7-8 W, 8-9 W, 10-100 W, 100 W-1 KW or any combination of these ranges, or alternatively greater than 1 KW. Other characteristics of the HILB (e.g., beam profile, beam divergence, or the like.) may be different or chosen to conform to a desired range.

In some embodiments, the HILB or MHILB may be made to have temporal variation in intensity or irradiance, which may be referred to as being pulsed or strobed. In some cases, LEDs or lasers may be pulsed. In some cases, a single light source may be pulsed. In some cases, high intensity light may be toggled between two or more light sources to create a temporal beam array to enhance its disruption effectiveness. A pulsed HILB or MHILB may be characterized by a pulse profile, such as on/off time, duty cycle, or frequency to name a few parameters. On/off time may refer to the specific time when the high intensity light is turned on and off. Duty cycle may represent a % of time the high intensity light is on relative to device operation. For example, a duty cycle of 80% may mean that the light is on 80% of operation time and off 20% of operation time. Frequency may refer to how fast the high intensity light cycles between "on" states (or high intensity or irradiance states). Note that the terms "on" and "off" may in some cases correspond to relative states. That is, a light source may still produce some light during the "off" state, but generally not enough to cause imaging disruption. Pulse profiles may be simple or complex. In some cases, one or more pulse profiles may be programmed into hardware, firmware, or software.

In some embodiments, a pulse profile may include a frequency in a range of 1-3 Hz, 3-7 Hz, 7-15 Hz, 15-20 Hz, 20-30 Hz, or any combination of ranges thereof, or alternatively even higher than 30 Hz or lower than 1 Hz. In some embodiments, it is possible to vary the power or intensity or irradiance of a beam by altering the power (voltage/current) driving it to achieve a variable source or various effects. In some embodiments, another element may be used to produce a pulse, e.g., a switchable LCD window, a MEMS device that periodically blocks the light, or some other time-based light blocking method.

In some embodiments, a pulse profile may include a duty cycle in a range of 1-5%, 5-10%, 10-20%, 20-30%, 30-50%, 50-70%, 70-80%, 80-90%, 90-95%, or 95-99%, or any combination of ranges thereof.

In some embodiments, one or more HILBs may operate concurrently with the broadband illumination source. In other embodiments, the broadband illumination source may be off during operation of the HILB(s). In some cases, the broadband illumination source may also be pulsed or strobed which may enhance disruption of an imaging system.

In some embodiments, first and second MHILBs are produced which may have a different wavelength or if using visible light, a different color of light (e.g., red and green, green and blue, red and blue . . . ). In some cases, it may be particularly useful that the pulse profiles for each MHILB are different in some way. For example, greater visual imaging disruption may sometimes be achieved by alternating the colors rather than having both colors pulse simultaneously. That is, the pulse sequence may alternate between the first and second MHILB such that during operation the first MHILB is on while the second MILB is off and vice versa. However, in some other cases, there can still be at least some overlap. For example, a pulse sequence may partially alter between the first and second MHILB such that during operation the first MHILB is on for only a portion of the time that the second MHILB is on (and the first MHILB is off for another portion of time that the second MHILB is on). In some cases, the pulse profile may change over time where for a period of time where pulses do not overlap and another period of time where pulses do overlap. In some embodiments, the different HILBs may be pulsed at different frequencies to create further confusion or disruption of an imaging system (e.g., HILB-1 is pulsed at 7 Hz while HILB-2 is pulsed at 9 Hz).

In some embodiments, the narrow-band light source(s) may be used in a steady mode that is non-pulsed. A steady mode may produce an HILB having a substantially constant intensity (e.g., that stays within about 20% of an average intensity value for at least 1 sec, alternatively, at least 2, 3, 5, or 10 seconds). In some cases, a steady mode may include some variations in intensity over time, but if so, at a frequency or intensity delta that is not easily perceived, e.g., by a visual system. In some cases, a steady mode light may have an on/off frequency of less than 1 Hz, alternatively less than 0.5, 0.2, or 0.1 Hz. In some embodiments, a steady mode light may have an on/off frequency of at least 60 Hz or alternatively at least 100 Hz. That is, a steady mode light may in some embodiments include pulsed light, but at a frequency that is either too low to cause distraction/disorientation or too high to be perceived by a visual system.

Optical Element (OE)

In embodiments employing an OE, the OE receives the HILB and modifies certain characteristics of the beam (without changing the characteristics of the illumination light 155). For example, a Divergence Modifying OE or DMOE may be selected that can increase the divergence of an HILB—for example, to increase the divergence of a laser beam to increase its coverage and/or to improve its safety profile. In other embodiments, the DMOE may be employed to collimate, focus, concentrate or decrease the divergence of an HILB, for example to make an LED light tighter to increase its intensity and effectiveness.

In other embodiments employing an OE, the OE receives the HILB and produces the desired MHILB or beam array of light which may be projected into a respective ZOD. To create a beam array, the OE transforms a single light beam into a pattern of light characterized by two or more light array elements that are spatially separated. As discussed, some OEs are multi-beam OEs ("MBOEs") that produce a multi-beam beam array whereas some OEs are light redirection OEs ("LROEs") that may be used to produce a temporal beam array. Alternatively, some OEs can modify the HILB by altering its divergence to create a Modified Divergence HILB.

A number of technologies are available for producing a multi-beam beam array of light using MBOEs. In some embodiments, a diffractive optical element (DOE) may be used, e.g., simple diffraction gratings, binary phase gratings such as Dammann gratings, and which may be reflective or transmissive in nature. In some embodiments, the MBOE includes one or more prismatic beam splitter to divide the light into two or more light elements. In some embodiments, the MBOE includes a microlens array. In some cases, the MBOE can be a composite or combination of a transmissive diffractive optics and a reflective surface. In some embodiments, an MBOE acts on coherent light, e.g., laser light.

In some embodiments, an LROE may include one or more moveable mirrors, moveable lenses, variable refractive index devices or the like. The LROE may be capable of redirecting the HILB in at least one dimension, alternatively two dimensions, alternatively three dimensions. The movable elements may be operated by use of motors, MEMS devices, piezoelectric devices, or some other magnetic or electromagnetic devices. In some cases, an LROE may include or use MEMS mirror technology that may be similar to that used in laser projectors.

In some embodiments, a single OE (MBOE or LROE) can produce one or more beam arrays from a single HILB where the beam array characteristics are altered by altering the HILB's characteristics such as bandwidth of the beam, beam profile, power, divergence, coherence, wavelength, angle of incidence or the like. In some embodiments, one HILB is altered. In other embodiments, two or more HILBs are used with a single OE to produce different beam arrays.

In other embodiments, more than one OE is used, for example to produce first and second beam arrays. Depending upon the desired application, the first OE may be the same or different than the second OE. When they are the same, in some embodiments, there may still be a difference in the two beam arrays with respect to different array properties or Beam Element properties (e.g., divergence, power, irradiance, wavelength, zone coverage, or some other feature). Various patterns and other properties of the beam array are discussed in detail later. Note that a light modifying assembly may include both MBOE and LROE features and may create both a spatial and a temporal beam array. For example, in some embodiments an MBOE may be mounted on a moveable stage so that the beam array may also have a temporal component. In some embodiments a moveable stage may include a piezoelectric device that causes vibration to thereby redirect the various first array beam elements. In some embodiments, various pulsing patterns can be added to create a temporal beam array.

Movable Stage

A number of moving elements can be incorporated into the Light Modifying Assembly to achieve various effects. For example, a DMOE can be on a movable stage or platform to allow for different focal points/divergence or convergence angles or to allow an operator to adjust the light characteristics during operation.

Another example is using movable elements to produce a temporal light array. A temporal beam array refers to an array of one or more light beams formed by redirecting a single light beam as function of time, e.g., by scanning or rastering the light. For example, the beam at first time $t_1$ has a first spatial property (first light beam) and the beam at a second time $t_2$ has a second spatial property (second light beam) that is different from the first spatial property. A temporal beam array may be produced by moving the light source itself, moving an LROE or moving some other element that produces a temporal array. The LROE may, for example, include one or more moveable mirrors, moveable lenses, or variable refractive index devices or the like.

Figure 2:
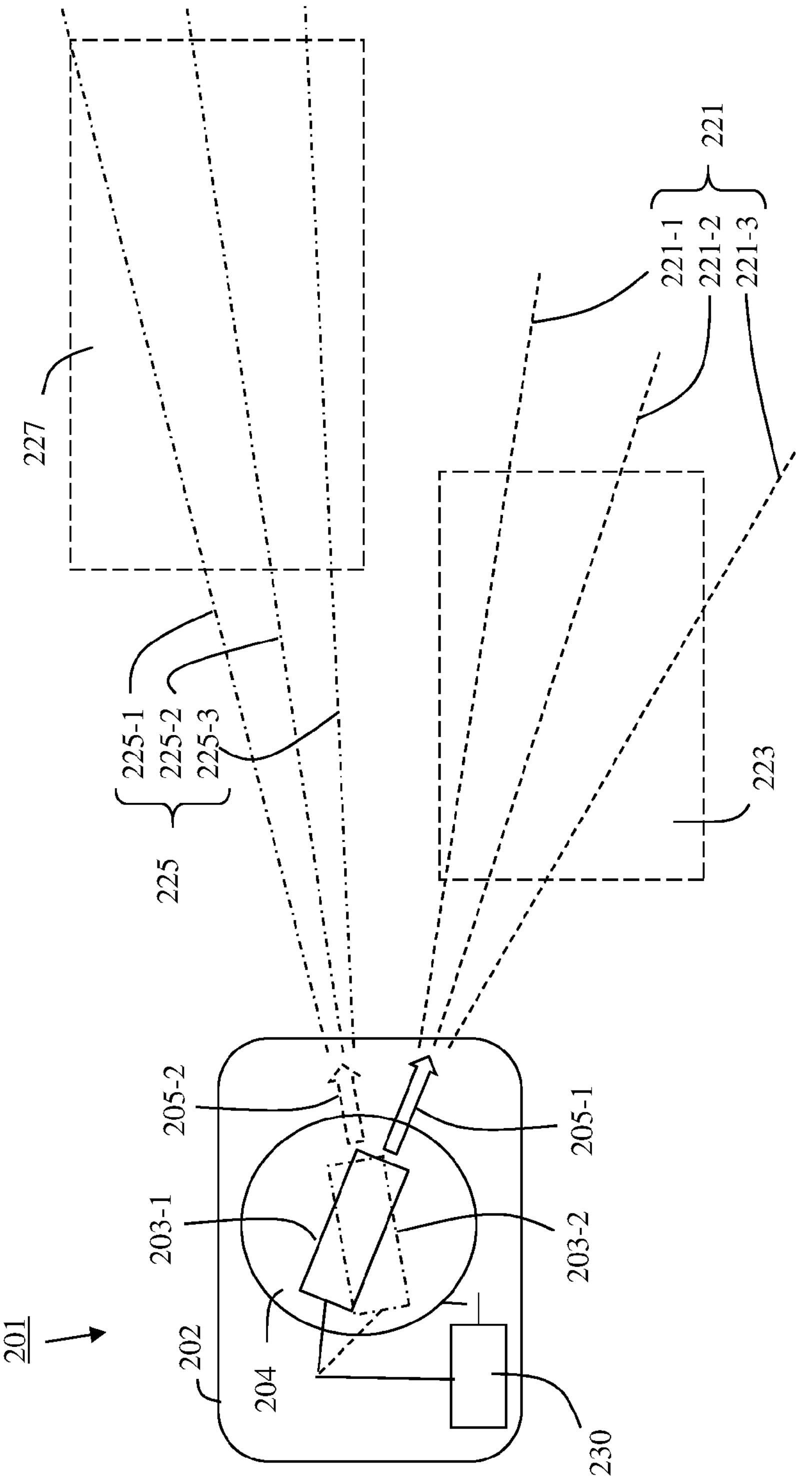
FIG. 2 is a schematic of an imaging disruption assembly that may be used in an illumination system according to some embodiments.

In some embodiments that produce a temporal beam array, the moving element, or movement producing element, is considered to be part of the light modifying assembly. Such an arrangement may or may not require an Optical Element. For example, the light modifying assembly may include a movable stage 104 that redirects the HILB itself as a function time. FIG. 2 is a schematic of an imaging disruption assembly that may be used in an illumination system according to some embodiments. Imaging disruption assembly 201 includes an optional housing 202 containing various components. A disruption light source 203-1 generates at least one high intensity light beam (HILB) 205-1 having a wavelength bandwidth of less than 100 nm that may be projected into a ZOD, e.g., first ZOD 223. Light source 203-1 or LROE may be mounted to a movable stage 204 capable of redirecting the HILB to form a temporal beam array 221 including light array elements 221-1 (formed at time $t_1$), 221-2 (formed at time $t_2$), and 221-3 (formed at $t_3$). Stage 204 and light source 203-1 may be controlled by a controller 230. The movable stage may be capable of redirecting the HILB in at least one dimension, alternatively two dimensions, alternatively three dimensions. The movable stage may be operated by use of motors, MEMS devices, piezoelectric devices, or some other magnetic or electromagnetic devices.

In some embodiments, an imaging disruption assembly may be capable of directing a beam array of disruptive light into more than one ZOD. For example, the imaging disruption assembly 201 may also include disruption light source 203-2 that generates at least one high intensity light beam (HILB) 205-2 having a wavelength bandwidth of less than 100 nm that is projected into a second ZOD 227. In some embodiments, light source 203-2 may be the same light source as 203-1 that has been repositioned to access the second ZOD. Alternatively, light source 203-2 may be a second light source operated independently of 203-1. In some cases, light source 203-2 or LROE may be mounted to movable stage 204 capable of redirecting the HILB to form a temporal beam array 225 including light array elements 225-1 (formed at time $t_1'$), 225-2 (formed at time $t_2'$), and 225-3 (formed at time $t_3'$). In embodiments where the light source 203-2 is a second light source, the movable stage may be the same as that used for light source 203-1, or it may be a second movable stage (not shown here) separate from movable stage 204. In some embodiments, an optical component such as a lens, mirror, or filter may be placed in the path of the HILB to further redirect or modify the beam array.

In some embodiments, instead of (or in addition to) placing the light source on a movable stage, an optical element that receives the HILB may move, e.g. be provided on a movable stage or otherwise designed to alter its position or property so as to form a temporal beam array.

The illumination system may include an imaging disruption switch for activating the imaging disruption assembly. The imaging disruption switch may be provided on or within housing 170. The switch may, for example, include a knob or dial that is turned, a slidable button, a push button, a toggle, a ring that is twisted or turned, a trigger, or some other physical Control Switch or Mechanism device accessible to the user. In some cases, a switch may be activated electronically, e.g., by a sound (e.g., a gunshot) or voice, or by a wireless signal from another device. Engaging a switch may close a circuit that allows electricity to pass, e.g., from power supply 140 (and/or controller 130) to the imaging disruption assembly 101. The operation of the imaging disruption device may in some cases be controlled (e.g., by controller 130, a switch, or some other component) to adjust intensity, on/off time, disruption mode (e.g., continuous, pulse, flicker or strobe frequency, color, color overlap, etc.), beam array pattern, or the like. In some cases, the imaging disruption switch may be part of or integrated into the illumination switch. In some embodiments, the illumination system may include a safety device to prevent accidental activation of the imaging disruption device and/or an automatic shutoff. In some embodiments, an imaging disruption switch may be designed so that it operates only when manually held in place, i.e., the imaging disruption device ceases operation if the disruption switch is released (e.g., a momentary switch).

Beam Array

Figure 3B:
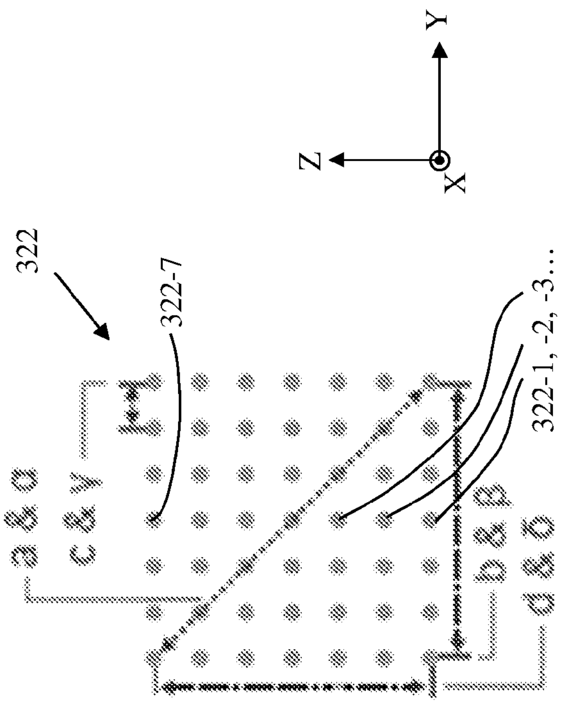
FIGS. 3A-3C are schematic drawings illustrating various properties of a beam array of light according to some embodiments.
Figure 3C:
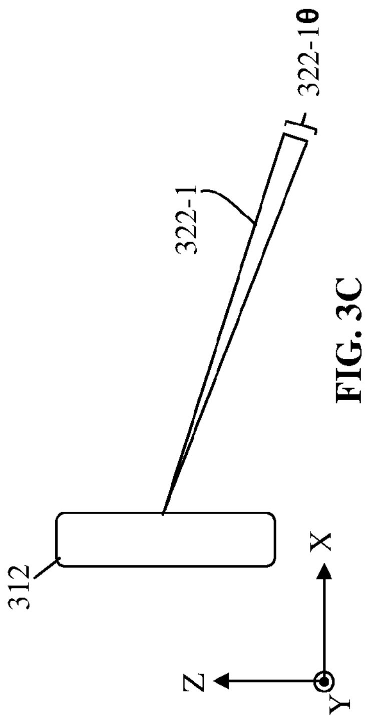
Figure 3A:
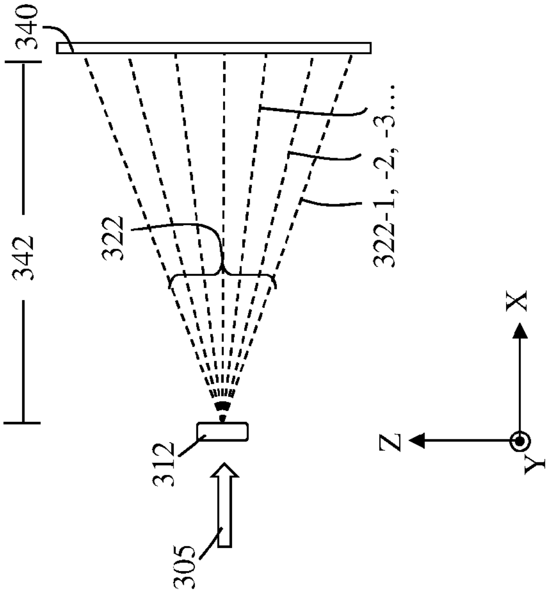

A wide variety of patterns and properties are available for beam array of imaging disruptive light. By way of example, FIGS. 3 and 4 illustrate some of the characteristics of a simple dot-matrix beam array pattern. For clarity, an XYZ axis is also provided for each of FIGS. 3A, 3B, and 3C. FIG. 3A shows a cross-sectional schematic of a 7×7 dot matrix beam array 322 having beam array elements 322-1, 322-2, 322-3 . . . 322-7. The beam array is produced by OE 312 that receives HILB 305 having a first light characteristic, e.g., power or irradiance. The power or irradiance of HILB 1005 is altered by the OE and somewhat divided between the various beam array elements, and thus, each beam array beam element (BE) is characterized by a light power that is necessarily less than the first light power. The sum of the powers of all the beam array beam elements (BEs) may be similar to the first HILB power, but in some embodiments, it is lower due to optical losses (sometimes referred to as the efficiency of the system). As discussed later, the characteristics or properties of each beam element (BE) in a beam array may be the same or different, and the different beam elements in an array need not be the same. For further characterization, the beam array of light 322 may be projected onto a surface 340 at a predefined distance 342. The projected beam array of light 322 is shown as FIG. 3B. Each beam array BE 322-1, -2, -3 . . . -7. appears as a small circle or dot. Instead of circles, other shapes may be formed such as squares, stars, triangles, and the like. In this example, the beam array may be characterized by numerous geometric properties, including but not limited to, size of each light element (e.g., diameter of the dot), diagonal pattern size "a", diagonal pattern divergence angle "a", lateral pattern size "b", lateral pattern divergence angle "B", vertical pattern size "d", vertical pattern divergence angle "8", dot spacing "c", and dot-to-dot divergence angle "y". Note that each pattern size or dot spacing measurement is a function of the predefined distance and the corresponding divergence angles. The pattern divergence (PD) angles are measured back to the OE position and are not a function of the predefined distance. Although FIG. 3B shows a very uniform beam array, there can be asymmetrical or non-uniform features.

In addition to pattern divergence (PD), each beam array element may be characterized by its own beam element divergence (BED). For example, as shown in FIG. 3C, beam array BE 322-1 has its own divergence BED angle 322-10. Pattern divergence (PD) and beam array beam element divergence (BED) are often a function of the properties of light beam 305, its angle of incidence on OE 312, and on the properties of OE 312.

Figure 4A:
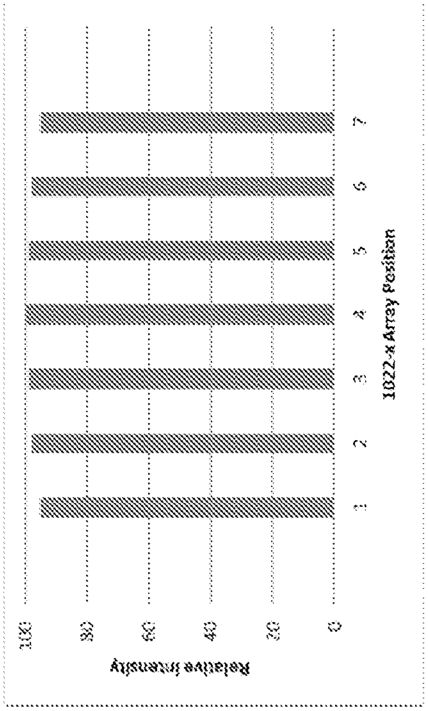
FIGS. 4A-4D are graphs illustrating light intensity distribution of array light elements according to some embodiments.
Figure 4B:
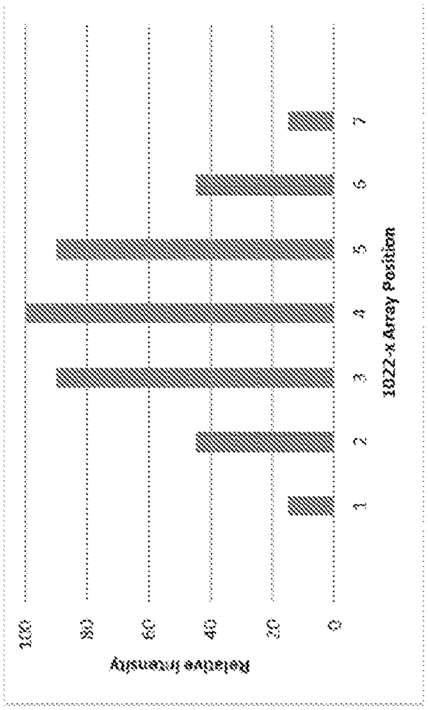
Figure 4C:
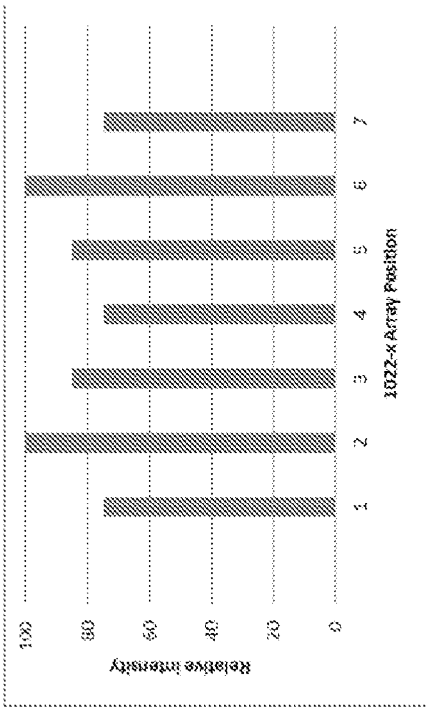
Figure 4D:
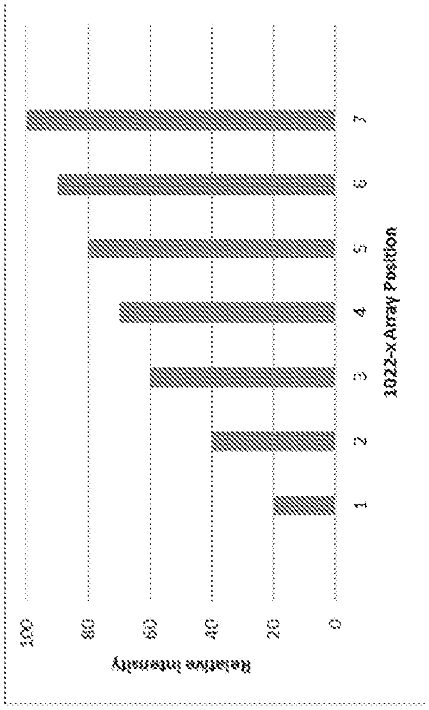

The light power and irradiance distribution across the beam array may also be a function of the properties of HILB 305, its angle of incidence on OE 312, and on the properties of the OE. For example, FIGS. 4A-4D illustrate some simple non-limiting examples of possible light power/irradiance distributions across seven (7) beam array elements, e.g., 322-1, -2, -3 . . . -7 (FIG. 3B). In some embodiments as shown in FIG. 4A, the relative light power/irradiance of each beam array element is uniform across the array. In some embodiments, a uniform beam array may be one where each beam array element of the array may have a power/irradiance that is within 50% of the mean power/irradiance of all the beam array elements, alternatively within 45%, 40%, 35%, 30%, 25%, 20%, 15%, 10%, or 5%. In some embodiments, a uniform beam array may be one where the relative standard deviation of the power/irradiance of all the beam array elements is less than 25%, alternatively less than 20%, 15%, 10%, or 5%. In some cases when projecting a beam array into a ZOD, it can be useful to have a relatively uniform set of array elements to deliver light having known properties to a potential target. However, less uniform power/irradiance profiles can also be useful and there are no limitations to the variation of BE properties in a beam array. For example, an array profile may appear as in FIG. 4B where the BE's in the center portion (322-3, -4, -5) have more power than outer portions (322-1, -2, -6, -7). Alternatively, the center may show a dip in power as in FIG. 4C. In some cases, the intensity may be skewed toward one side as in FIG. 4D. Many other distributions are possible and may be effective.

It should be noted that in some cases, the OE may produce a few weak (lower power, second or third order etc.) satellite elements or light beams, but these are not considered part of the beam array due to their low power ("non-array elements"). Such non-array elements may fall within the general area of the beam array pattern or define the edge of the beam array pattern or both. In some embodiments, a non-array element may have a power or irradiance that is less than 10% of the maximum intensity beam array element, alternatively less than 5%, 2%, or 1%. In some embodiments, the average intensity of array light elements within the beam array is within 50% of the maximum intensity of array light elements within the beam array, alternatively within 60%, 70%, 80%, or 90%.

As mentioned, the properties of the beam array of light may be selected to deter or affect (disrupt, distract, etc.) particular threats that may exist within a particular ZOD. There is no particular limitation on the intensity or irradiance of the array light elements in the ZOD, but in some embodiments, each array light element may have an irradiance in a range of $10^{-2}$-$10^{-1}$ mW/cm$^2$, alternatively $10^{-1}$-1 mW/cm$^2$, alternatively 1-10 mW/cm$^2$, alternatively 10-100 mW/cm$^2$, alternatively 100-1000 mW/cm$^2$, alternatively 1-10 W/cm$^2$, alternatively 10-102 W/cm$^2$, alternatively $10^2$-$10^3$ W/cm$^2$, or higher or any combination of ranges thereof. In some embodiments, an array light element may have an irradiance less than $10^5$ mW/cm$^2$ or greater than 10 W/cm$^2$. In some embodiments, the irradiance of an array light element in the ZOD is from 0.1 mW/cm$^2$ to 50 mW/cm$^2$.

The beam array of light may take on many other patterns than that shown in FIGS. 3A-3C. A few additional non-limiting examples are provided in FIGS. 5A-5I.

Figure 5A:
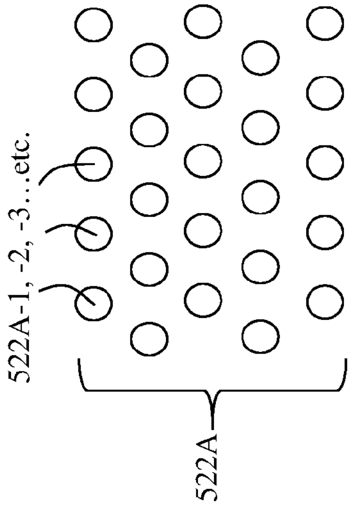
FIGS. 5A-5I are schematic drawings illustrating various patterns of a beam array of light according to some embodiments.

FIG. 5A shows a beam array 512A having another uniform pattern of beam array light elements 522A-1, -2, -3 . . . etc. that are equally spaced, but relative to FIG. 3, are offset.

Figure 5B:
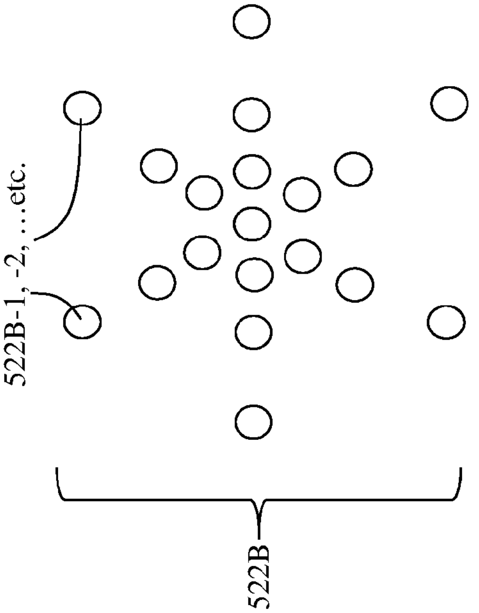

FIG. 5B shows a beam array 512B having a pattern of beam array light elements 522B-1, -2 . . . etc. Here the central elements are more closely spaced than the outer elements.

Figure 5C:
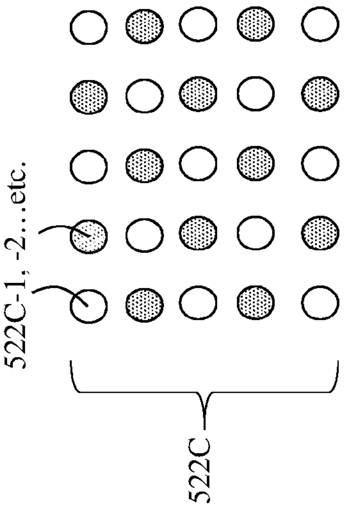

FIG. 5C shows a beam array 512C having a pattern of array light elements 522C-1, -2 . . . etc. This is similar to FIG. 3, but the open dots (e.g., 522C-1) represent array light elements having a first wavelength and shaded dots (e.g., 522C-2) represent array light elements having a second wavelength of light.

Figure 5D:
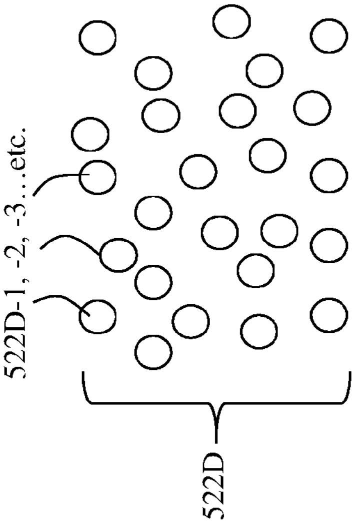

FIG. 5D shows a beam array 522D having a random pattern of array light elements 522D-1, -2, -3 . . . etc. Not shown, a beam array pattern may include both random and non-random portions.

Figure 5E:
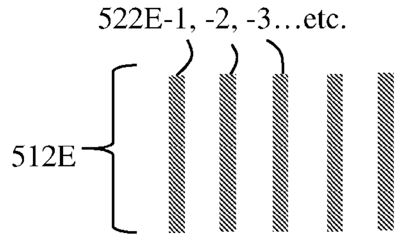

FIG. 5E shows a beam array 512 having a pattern of array light elements 522E-1, -2, -3 . . . etc. These appear as spaced lines. Although spaced uniformly in the figure, the spacing, thickness, and/or length of the lines may vary across the array.

Figure 5F:
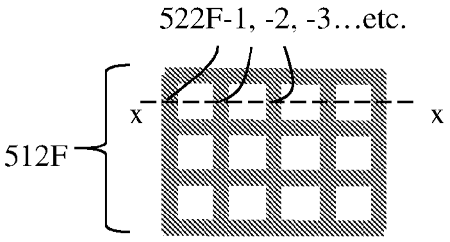

FIG. 5F shows a beam array 512F having a pattern of first array light elements that form a grid or a line matrix. Here, certain pattern elements are "connected" in a sense while others are not, e.g., if one looks along plane x-x, it is clear that array light elements 522F-1, -2, -3 . . . etc. are separated in space in this plane.

Figure 5G:
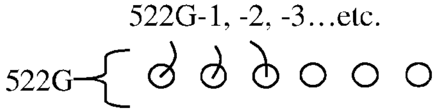
Figure 5H:
Figure 5I:
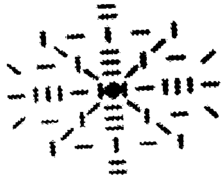

FIG. 5G shows a beam array 522G having a linear pattern of array light elements 522G-1, -2, -3 . . . etc. Other patterns are shown in FIGS. 5H and 5I but it should be noted that these patterns serve only as examples and are non-limiting.

Other Imaging Disruption Device Features

Figure 6:
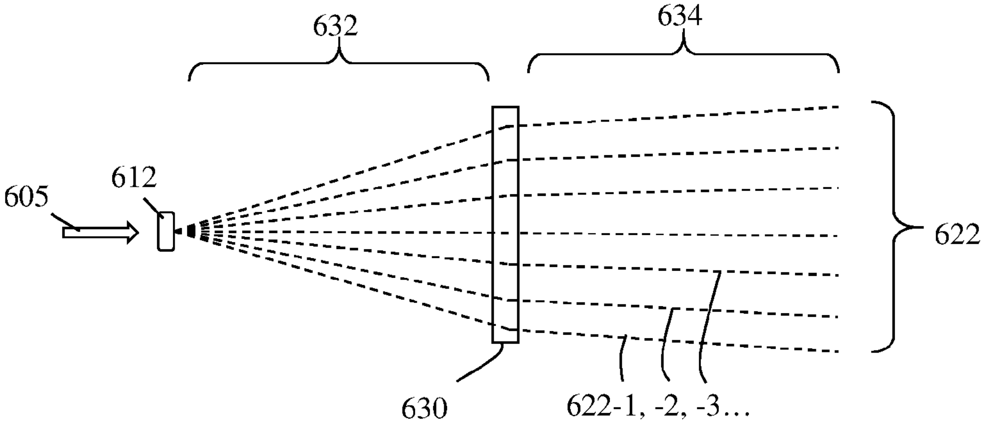
FIG. 6 is a schematic drawing showing a divergence modifying element acting on a beam array of light according to some embodiments.

In some embodiments, the light modifying assembly may include other elements that act upon disruption light such as lenses, mirrors, prisms, light guides, attenuators, filters, collimators, polarizers, wave-plates or the like. For example, one or more of the other elements may be provided between the light source and the OE to collimate, shape, polarize, redirect or otherwise change the profile of the intense beam of light. In some embodiments, one or more other elements may be provided to receive light from the OE in order to modify the beam array in some way. For example, a lens or mirror may reshape the array or redirect the array. For example, FIG. 6 shows an embodiment where HILB 605 is received by OE 612 to produce a beam array of light 622 having array light elements 622-1, -2, -3 . . . etc. In a first region 632, the beam array is characterized by a first pattern divergence angle (PD1). A divergence modifying element 630 receives the beam array of light and acts to alter the divergence of the array pattern being projected (pattern divergence angle PD2). As shown in the present embodiment, the beam array in the second region 634 (after the collimator) is characterized by a second pattern divergence angle that is less than the first pattern divergence angle. The divergence modifying element 630 may include collimating optics, lenses, or the like. In some cases, this arrangement may increase the range of effectiveness of the beam array for projection into ZODs that are further away. In some embodiments, the divergence modifying element may also alter, e.g., reduce or increase, the individual beam element divergence (BED) of the array beam elements. Alternatively, separate optical components may be introduced into the path of the beam array to act on the light element beam in the ZOD. It is also possible for the divergence modifying element 630 to be moved in and out of the field of the beam array to act upon the beams as necessary to alter the ZOD dimensions. The divergence modifying element 630 may optionally be tilted to alter the general direction or properties of the beam array in the second region 634.

In some embodiments, the divergence modifying element, or any other optical feature (e.g., lenses, mirrors, filters, shutters . . . etc.) in the path of the beam array of light, may be adjustable so that the beam array may be modified when projected into different portions of a ZOD or to compensate for an ZOD that may be changing relative to the position of the imaging disruption system. Such adjustable optical features, if used, may be independently selected for each OE and may modify the beam array pattern, pattern divergence, light element beam divergence, polarization, power, irradiance, intensity, on/off rate, or the like. In some embodiments, the adjustment may be based on information from the controller with respect to the presence or location of a targeted person or sensor in a ZOD.

In some embodiments, the light modifying assembly or other imaging disruption system may include mechanisms or electronic elements that impart movement to the MHILB or to the beam array. For example, an OE, a lens, a mirror, the light source or some other relevant feature may be made to vibrate, turn, spin, swing, or move in some way to alter the trajectory of the MHILB or beam array of light. In some embodiments, the MHILB or beam array may sweep its respective ZOD to cover the entire area or otherwise make it difficult for a target to avoid the deterring light. In some embodiments, the motion need not be coupled to any specific target tracking or aiming devices which are often expensive. The MHLB or beam array may sweep from side to side, up and down, in a circular or elliptical motion, rotate about an axis, in a random pattern, or some other motion or any combination thereof. In some embodiments, the motion of a first MHILB or beam array may be controlled independently of the motion of a second MHILB or beam array or both. In some embodiments, motion may be applied to the entire light modifying assembly as a unit. In some cases, the mechanism to control movement is linked to a detecting or sensing mechanism that provides one or more functions such as target recognition, target location, classification, position, velocity, etc. or that can track a target.

A few non-limiting examples of how a beam array may be shaped or moved are shown in FIGS. 7A-7D and 8A-8E. It should be noted however that any MHLIB may be moved to create the desired effect and area coverage at the desired range or distance (the ZOD).

Figure 7A:
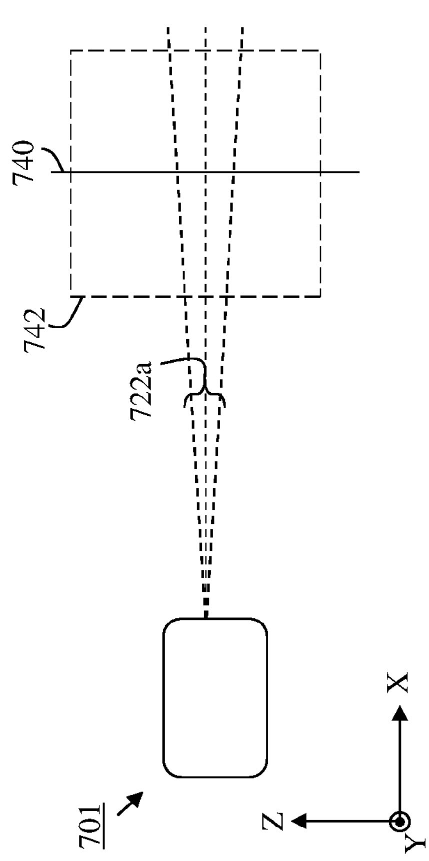
FIGS. 7A-7D are schematic drawings illustrating various views of a beam array of light as a function of pattern divergence angle according to some embodiments.
Figure 7B:
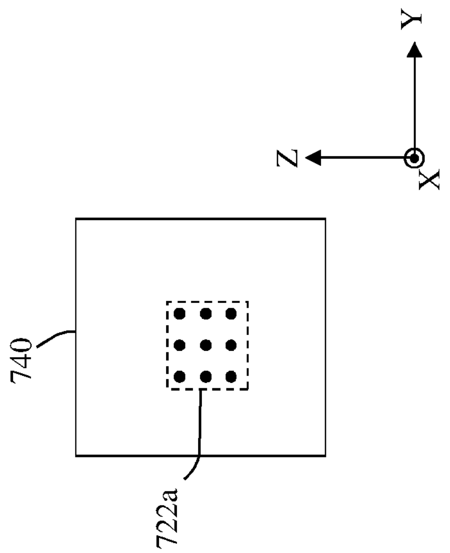
Figure 7C:
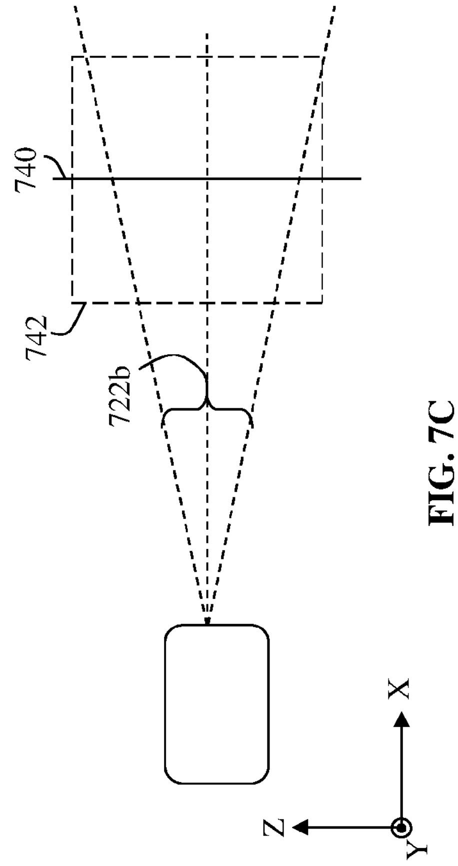
Figure 7D:
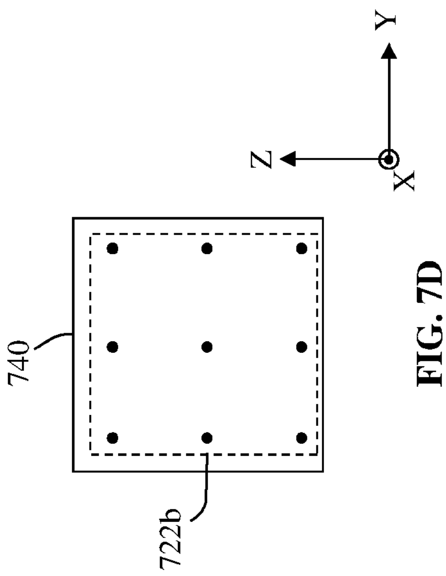

FIG. 7A shows an imaging disruption device 701 producing a beam array of light **722*a* having a first pattern divergence angle. For clarity, the details of the system 1400 are not shown, the individual array light elements are not labeled, and only one beam array is illustrated. In this embodiment, the beam array includes a 3×3 matrix of array light elements that are projected into ZOD 742. An imaginary projection plane 740 is also shown. FIG. 7B shows the beam array of light 722***a* projected onto the imaginary plane 740. In FIG. 7C, the pattern divergence angle of the beam array is increased using methods previously described to produce a beam array of light 722*b* having a second pattern divergence angle that is greater than the first pattern divergence angle. FIG. 7D shows the beam array of light 722*b* projected onto the imaginary plane 740. Beam array 722*b* may cover a larger portion of the ZOD, but the density of array light elements is reduced. Note that in some embodiments, the divergence angle may be ramped up and down between the first and second divergence angles to create motion in the array light elements. As mentioned, such motion may make it difficult for a target to avoid the deterring light. FIGS. 7A-7D illustrate a substantial increase in pattern divergence angle, but in some embodiments, the change in pattern divergence angle may be much smaller or may decrease instead of increase. Altering the pattern appearance or divergence as a function of time within a ZOD may be considered an embodiment of a "dynamic beam array".

Figure 8A:
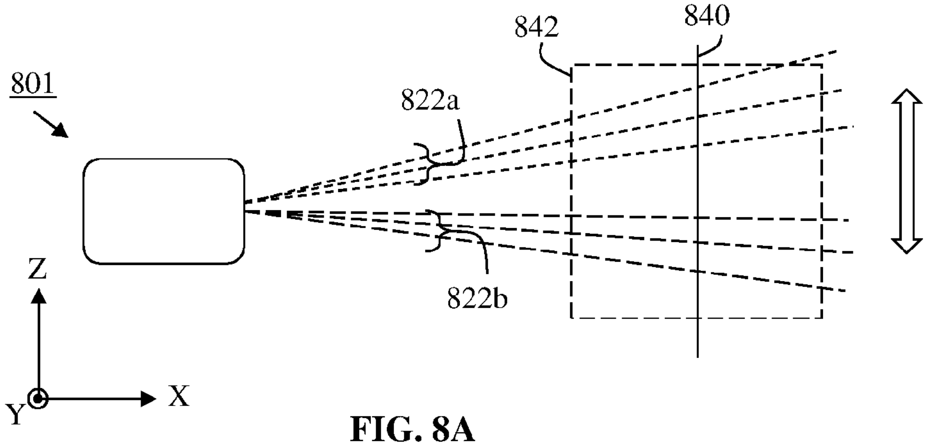
FIGS. 8A-8E are schematic drawings illustrating various views of a beam array of light as a function of projection direction according to some embodiments.
Figure 8C:
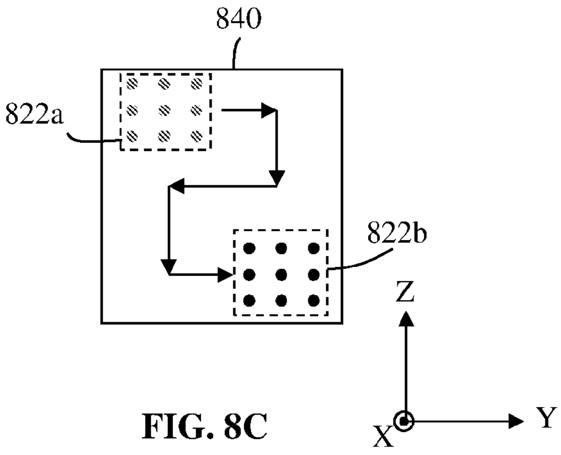
Figure 8B:
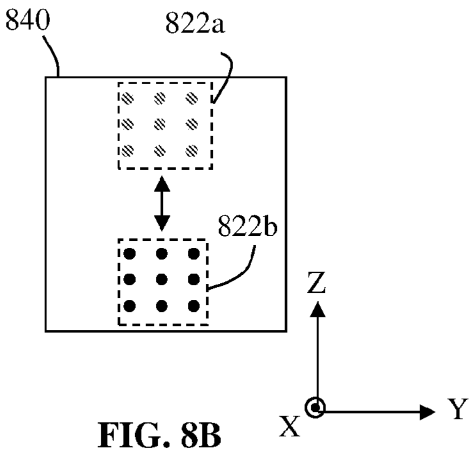
Figure 8D:
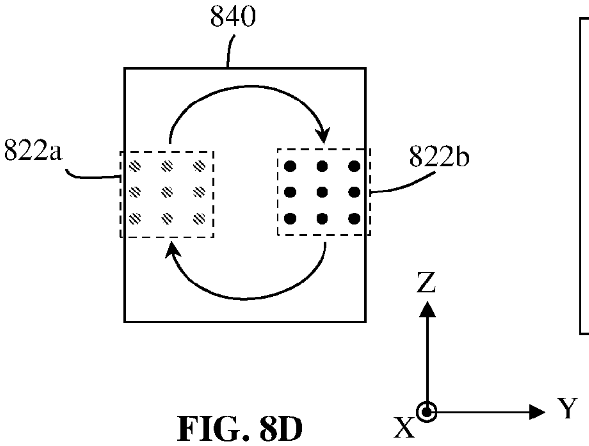
Figure 8E:
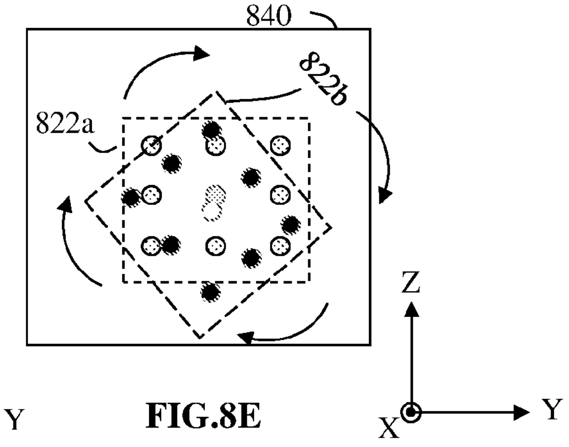

In FIG. 8A there is shown an imaging disruption device 801 producing a beam array of light 822*a* having a first projection direction and moved or swept to a second projection direction 852*b*. Redirecting a beam array as function of time within a ZOD may be considered another embodiment of a "dynamic beam array". For example, the beam array direction may be altered by one or more mechanisms that may move one or more lenses or mirrors in the path of the beam array. For clarity, the details of device 801 are not shown and the individual array light elements are not labeled. In this embodiment, the beam array includes a 3×3 matrix of array light elements that are projected into ZOD 842, but any array pattern may be used. An imaginary projection plane 840 is also shown. FIG. 8B shows the beam array of light 822 having a first position 822*a* when projected in the first direction onto the imaginary plane 840 and a second position 822*b* when projected in the second direction onto the imaginary plane 840. By altering the projection direction, a larger area of the ZOD may be covered. In some embodiments, the beam array sweeps back and forth between the two projection directions as illustrated by the double arrow in FIG. 8B. As mentioned, many other motions may be used, e.g., a left-right, up-down, circular, spiral, raster, or some combination or other motion. For example, FIG. 8C shows the beam array 822*a* starting in a first position and is then scanned or rastered across the ZOD to a second position as beam array 822*b*. In FIG. 8D, the beam array is moved in an elliptical pattern between a 822*a* and 822*b*. In FIG. 8E, the beam array is rotated about its center point. Rotation may be full (360°) or partial (less than 360°), about a point other than the center, or periodically or randomly reversed in direction. Rotation may be combined with other motions such as sweeping or rastering. FIGS. 8A-8E illustrate substantial change in the apparent position of the beam array within the ZOD, but in some embodiments, the changes may be much smaller.

Not shown, the use of pattern divergence angle and projection direction may optionally be used together to produce a wide variety of MHILB and/or beam array patterns and motion, and which may further be combined with other properties such as irradiance, intensity, wavelength, pulse frequency, on/off cycles and the like.

In some embodiments, the MHILB or beam array may be directed in about the same general direction as the illumination light. Alternatively, the MHILB or beam array may be directed (as measured from the approximate center of the MHILB or beam array of beam elements) at an angle relative to the primary direction of the illumination light (as measured from the approximate center of the illumination beam). In some embodiments, relative to the primary direction of illumination light, the angle of the MHILB or beam array may be in a range of 0° to 30°, alternatively 30° to 60°, alternatively 60° to 90°, alternatively 90° to 120°, alternatively 120° to 150°, alternatively 150° to 180°, or any combination of ranges thereof. In some cases, the angle may be variable and/or adjustable.

As mentioned, a controller may be in communication with the disruption light source, the light modifying assembly, movable stage, or some combination. The controller may be in communication with systems external to the imaging disruption device whereby the controller may send or receive information or instructions to such external systems. The imaging disruption device may be manually controlled, autonomously controlled, remotely controlled, or operated through a mixture of two or more manual, autonomous, and remote control. A controller may be used to operate the disruption light source (e.g., turning it on/off, power, wavelength selection, pulse frequency, position/orientation, motion . . . etc.), a movable stage, an OE (position/orientation, motion), other optical features (e.g., lenses, mirrors, filters or shutters, redirection assembly, the electronic switch assembly), the orientation of a system subassembly, onboard cameras, sensors, tracking devices, and practically any other component of the imaging disruption device.

Power Source, Controller, Additional Components

The illumination system generally includes at least one portable power source, e.g., power source 140, but may optionally include multiple power sources for powering multiple components. The power source may include an energy storage element such as a battery, a capacitor (e.g., a supercapacitor), a battery/capacitor hybrid, or a fuel cell that provides electric power to the various system components. There is no particular limit on the type of energy storage element. Some non-limiting examples of batteries include lithium-ion batteries, NiCd batteries, NiMH batteries, and alkaline batteries. The battery may be a primary battery (single use) or a secondary battery (rechargeable). The desired voltage, power storage, and form factor of the battery depends upon the particular components of the illumination system and the battery technology itself. In some cases a battery may supply at least about 1.5V, but may instead supply at least 3.0V or more. A battery may have a variety of sizes and shapes such as conventional cells (AAA, AA, C, D . . . etc.), button cells (e.g., CR123A, RCR123A, etc.), 18650 cells, or the like. The portable illumination system generally does not require mains (e.g., 110/220 V electric lines) for power, but in some embodiments, they may also be operable by plugging into such mains.

A controller (e.g., controller 130) may include an integrated circuit such as a programmable microprocessor, a custom wired integrated circuit or discrete circuit components. In some cases, the controller may include logic circuits, memory, a CPU, software, firmware, connectors for interfacing with various components of the illumination system, a power source connector, or the like. The illumination system may include multiple controllers. In addition to operating the various components of the illumination system as previously mentioned, the controller(s) may also control the charging of a rechargeable power source, and perform diagnostics and status checks on the power source and various other system components.

The additional components if present may supplement the utility of the illumination system in some way. In some non-limiting examples, an additional component (e.g., additional component 160-1, 160-2, 160-3 . . . **160-*x***) may include a camera, a microphone, a speaker, a wireless communication device, a USB port, an information display, an accelerometer, a magnetometer, a gyroscope, a GPS, a status indicator or icon, an LED, a light sensor (e.g., visible or IR light), a proximity sensor, a range detector, a thermal imaging device, a movement sensor, a range finder, a LiDAR module, a radar module, a proximity sensor, a haptic feedback device, a biometric sensor, a moisture sensor, a pressure sensor, an infrared light source, a laser pointer, a taser, a spray device (e.g., for pepper spray, mace, tear gas, a marking material, or the like), a lighter, a distress beacon, or a illumination system. In some cases, the additional component may allow for video/audio recording of a situation, determine a distance of an object or target, convey system status information to the user, send/receive a message to/from others, signal a need for assistance, connect to or generate WIFI, Bluetooth, or other wireless signals, or provide some other use.

In some embodiments, an illumination system may include one or more attention light sources that alert a third party to a situation. For example, the illumination system may include red, green or blue LEDs that flash to alert someone that the user is a police officer. In some cases, an illumination system includes a flashing light source that alerts a third party that the user needs help. In some cases, an illumination system may be used, optionally with one or more other additional components, to convey a warning to a third party, for example, a warning to stop. In some cases, the narrow-band light source or even the broadband illumination source (instead of, or in addition to, a separate attention light source) may also be used for such alerting/warning functions.

Housing; General Form; Switches

There is no particular limitation on the housing, but in some cases, the housing allows for convenient portability of the illumination system. The illumination system may be hand-held or worn on a person (e.g., attached to a helmet, vest, belt, suspenders, arm band, leg band, or the like) or both. In some cases, the illumination system is worn on a person when transported but operated in a hand-held fashion. In some embodiments, the illumination system may be worn on a person and operated from the worn position. In some embodiments, the illumination system may be attached to a weapon such as a handgun, taser, rifle, or the like. In some embodiments, the illumination system may be mountable on or built into a manned or unmanned ground vehicle, sea vessel, aircraft or spaceship. The illumination system may be mountable on or built into robots. In some cases, the illumination system may be mountable on a portable stand or tripod.

As mentioned, a housing (such as housing 170), may act as a support to which other system elements may be attached. Note that unless specifically noted to the contrary, "attached" may mean attachment to a housing external surface, within a housing cavity, or both. Further, "attached" may mean any kind of physical association between elements that serves to hold the elements sufficiently in place to allow their intended functionality. Some non-limiting examples of attachment technologies may include snap-fit pieces, adhesives, welding, soldering, screws, nuts/bolts, rivets, clinches, crimping, tabs/holes, interlocking features, or the like.

In some embodiments, the housing may include one or more different materials, at least some of which may have a relatively low density (e.g., a density of less than 5 g/cm$^3$, alternatively less than 4 g/cm$^3$, or 3 g/cm$^3$). For example, a housing may include plastic, lower density metals such as aluminum, magnesium, titanium, beryllium (or their alloys), or composite materials. However, a housing may include more dense materials such as steel, brass, or the like. The particular choice of material depends in part upon the desired properties of the illumination system, e.g., overall weight, physical durability, environmental durability, tactile properties, moldability, flexibility, or the like. In some embodiments, the housing may include fabrics or other materials that are worn or form part of a wearable garment, belt, shoe, or headgear.

Figure 9A:
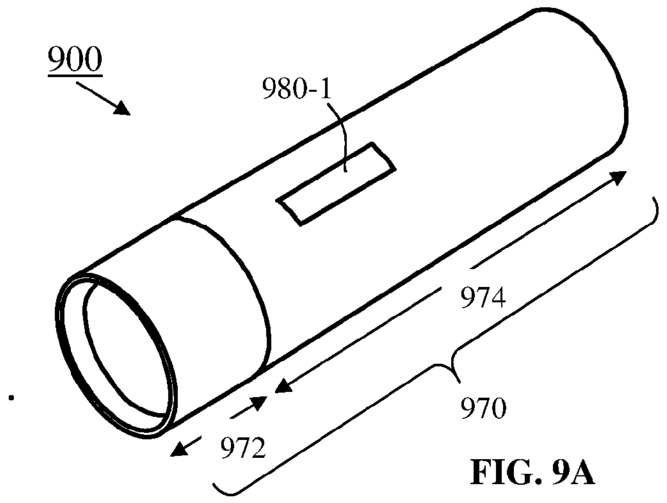
FIGS. 9A-9D are various views of a non-limiting example of an illumination system according to some embodiments.
Figure 9B:
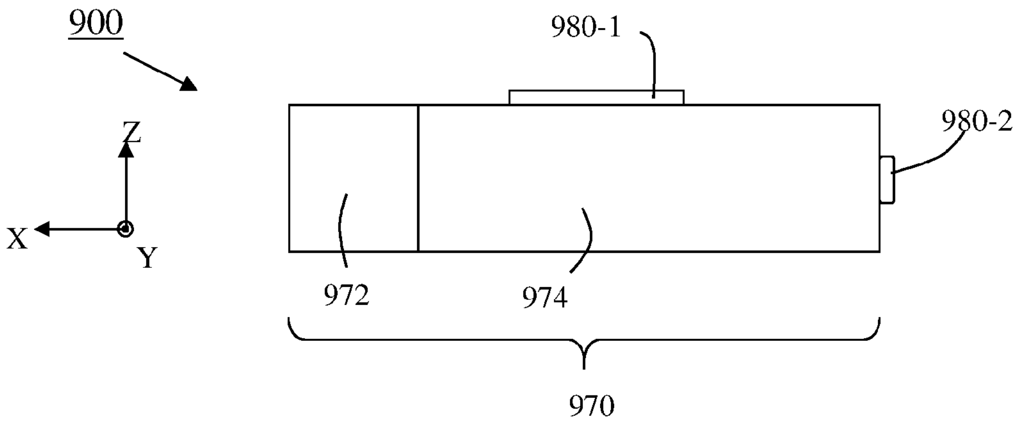
Figure 9C:
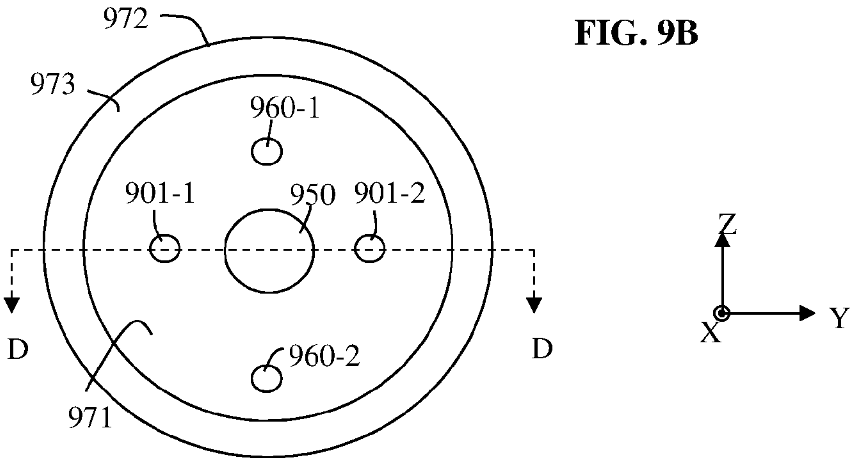
Figure 9D:
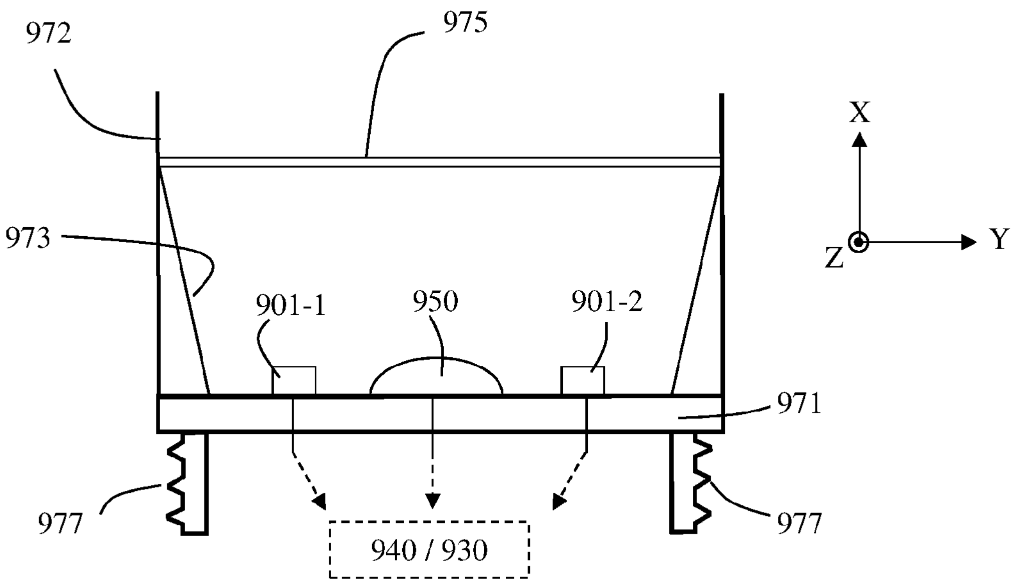

In some embodiments, the illumination system may have a shape that is similar to a conventional flashlight as one of ordinary skill would recognize. In some embodiments, the housing may include a generally cylindrical portion which, for example, may house a power source such as a battery pack or the like. FIGS. 9A-9D are various views of a non-limiting example of an illumination system according to some embodiments. FIG. 9A is a perspective view and FIG. 9B is a side view of illumination system 900 which includes housing 970 having a head assembly 972 and a body assembly 974. FIG. 9C is an end-on view of the head assembly. FIG. 9D is a cross-sectional view of the head assembly along cutline D-D in FIG. 9C. In some embodiments, broadband illumination source 950 is provided as part of the head assembly 972. In some embodiments, the head assembly 972 may further include one or more imaging disruption devices or assemblies (901-1 and 901-2). Alternatively (not shown), one or more imaging disruption devices may be provided on a housing portion other than the head assembly. In some cases, the head assembly may further include one or more additional components (960-1 and 960-2). The broadband illumination source 950, the imaging disruption device(s), and additional component(s) may in some cases be provided or mounted on head assembly substrate 971. In some cases, substrate 971 may be or include a printed circuit board. The broadband illumination source 950 and the imaging disruption devices 901-1, 901-2 may be in electrical communication with a power source 940 and a controller 930, either or both of which, may be located in the head assembly 972, on the substrate 971, or in the body assembly 974. In some embodiments, the head assembly may further include an angled side wall 973. The head assembly substrate or the angled side wall or both may have a high reflectivity with respect to visible light (e.g., at least 40% reflective, or alternatively, at least 50%, 60%, 70%, 80%, or 90% reflective). The head assembly may in some cases include a head cover 975 that is substantially transparent to visible light (e.g., at least 40% transparent, or alternatively, at least 50%, 60%, 70%, 80%, or 90% transparent). The head cover may protect the illumination source and the imaging disruption devices from physical or environmental damage. In some cases, the head cover may also serve as an optical element or component that acts on light emitted from the broadband illumination source 950 and/or imaging disruption devices 901-1 and 901-2. In some cases, each light source (950, 901-1, 901-2, etc.) may have its own OE to shape the light beams accordingly. The plurality of OEs may be static (fixed in place) or the head cover may include a plurality of OEs so that may be rotated into place to thereby alter the beam array produced by each disruption light source and/or illumination light source.

In some embodiments, the parts labeled as 901-1 and 901-2 may in some cases represent disruption light sources (narrow-band light sources) and corresponding OEs for forming the MHILB or beam arrays may be provided elsewhere. For example, the reflective sidewall 973 structure and/or the substrate 971 may act as a DMOE to modify the divergence of the HILB. Alternatively, or in addition, part of the head cover 975 may include a divergence modifying lens (a DMOE) or even an MBOE. In such embodiments, the optical element may also act on the illumination light.

The illumination system may further include one or more switches (980-1 on the body assembly wall, and/or 980-2 on the body assembly end cap, and/or (not shown) a remote switch connected to the body via wire or wirelessly) for operating the broadband illumination source, the imaging disruption device(s), and additional component(s). Although two switches are shown on the body assembly 974, there may be only one switch or additional switches present, and some or all of the switches may instead be located as part of the head assembly. Various switching mechanisms are known in the art and need not be described here in detail.

Switching Functionality

When an illumination system includes multiple switches, they may in some cases be used to control different device functions and/or have different switching sequences or operations. However, in some embodiments, the switches may be operated in the same way to control the same device functions.

In some embodiments, a single switch may be used to provide one or more operations. For example, a switch may a) turn on the illumination source at a low brightness, b) turn on the illumination source at a high brightness, c) turn on a first high-intensity light source in a non-pulsed mode, d) turn on a second high-intensity light source in a non-pulsed mode, e) turn on first and second high-intensity light sources to pulse in a preprogrammed pulse sequence, or f) change a preprogrammed pulse sequence to a different sequence. Many other options are available.

In some cases, a switch may include a button that is pressed and toggles between operational states. In some cases, this may be based on i) the number of presses, ii) the duration of a press, iii) the time spacing between presses, iv) the force of the press, or v) any combination of (i)-(iv).

In some embodiments, a switch may be pressed and held for a hold duration time X. An system operation may be responsive to a particular hold time. In a non-limiting example, the imaging disruption function, i.e., turning on the narrow-band light source(s) may require a deliberate press time to avoid accidental activation. In some cases, the hold duration time X may be at least 0.5 sec, alternatively at least 1, 2, or 3 seconds. After the minimum time, the imaging disruption may activate, e.g., with a preprogrammed pulse sequence. A short press thereafter may in some cases turn off the narrow-band light source(s), or alternatively toggle between different preprogrammed settings. In some cases, the imaging disruption functionality can be programmed to turn off automatically after a set time. Alternatively, a similar or even longer hold duration time X as used to activate the narrow-band light source(s) may be applied to turn off the sources or toggle between different programmed settings.

In some embodiments, rather than being responsive to a minimum hold duration time, X may instead be required to be in a range of 0.5-1 sec, 1-2 sec, 2-3 sec, or 3-4 sec, or any combination of ranges thereof. If X is outside the range, activation will not occur, and optionally some other function may be programmed to turn on or off. The system may be designed to be responsive two or more ranges of hold duration times that cause different operations to occur. Similarly, a switch may be pressed multiple times Y, typically within a preset time period range of 0-0.5 sec, 0.5-1 sec, 1-2 sec, 2-3 sec, 3-4 sec, or any combination of ranges thereof. A single press may cause one function (e.g., activation of the broadband illumination source) whereas a double press may activate the narrow-band light source(s). Subsequent presses (single, double . . . etc.) may in some cases toggle between preprogrammed settings, e.g., that change a pulse sequence of the narrow-band light source(s).

In some embodiments, the switch operates on multiple narrow-band light sources that produce light in different regions of the visible spectrum, optionally in an alternating pulsed fashion. The switch may simply turn them on and off in a single preprogrammed pulse profile, but alternatively, may change to another preprogrammed pulse profile having a different color sequence, pulse duration, frequency, or the like, as described elsewhere.

In some embodiments, as shown in FIG. 9D, the head assembly may further include a threaded neck 977 such that the head assembly may be reversibly detachable from the body assembly, e.g., to access batteries, replace components, or the like. Alternatively, attachment of the head assembly to the body assembly may utilize snap fit components, screws, tabs/slots, or some other attachment element.

In some embodiments, the illumination system may have a shape other than cylindrical. In cross section, rather than circular, the housing or body assembly may appear oblong, elliptical, triangular square, rectangular, trapezoidal, prismatic, pentagonal, hexagonal, heptagonal, octagonal, or some other shape, with sharp edges, rounded edges, or both. In some cases, the illumination system may include a handle that is not directly behind the head assembly (e.g., similar to a right-angle flashlight). In some cases, the illumination system may have a curved ergonomic shape so that it fits more naturally in a person's hand. In some embodiments, the illumination system may be mounted to a weapon, e.g., a handgun or rifle. In some embodiments, the illumination system may be worn (wearable), or attachable to another device (such a tripod, stand, etc.) or a vehicle, or other moving object or any other device as necessary.

In some embodiments, one or more imaging disruption devices are provided on a section of housing that is separate from the broadband illumination source. In some cases, an imaging disruption device may be positioned so that the MHILB or beam array may be directed in a direction that is different from the primary direction of the illumination light, e.g., at an angle greater or even in an opposite direction. For example, a user may flee a threatening situation where the illumination light is used to see and the imaging disruption MHILB or beam array is used to distract or deter a threat that is following.

Throwable Illumination System

In some embodiments, instead of (or in addition to) being hand-held, mountable, or the like, a portable illumination system may be "throwable" meaning a person or a device may physically project, roll, slide, or otherwise cause the system to move from one location to another. For example, a police officer or military personnel may throw the illumination device into a room or area where there is a threatening situation or a hostile combatant. In some cases, this may correspond to a ZOD. The throwable portable illumination system may include any of the physical and operational features as described elsewhere herein that may be used to illuminate an area and/or cause imaging disruption to persons or devices in that area.

Figure 10:
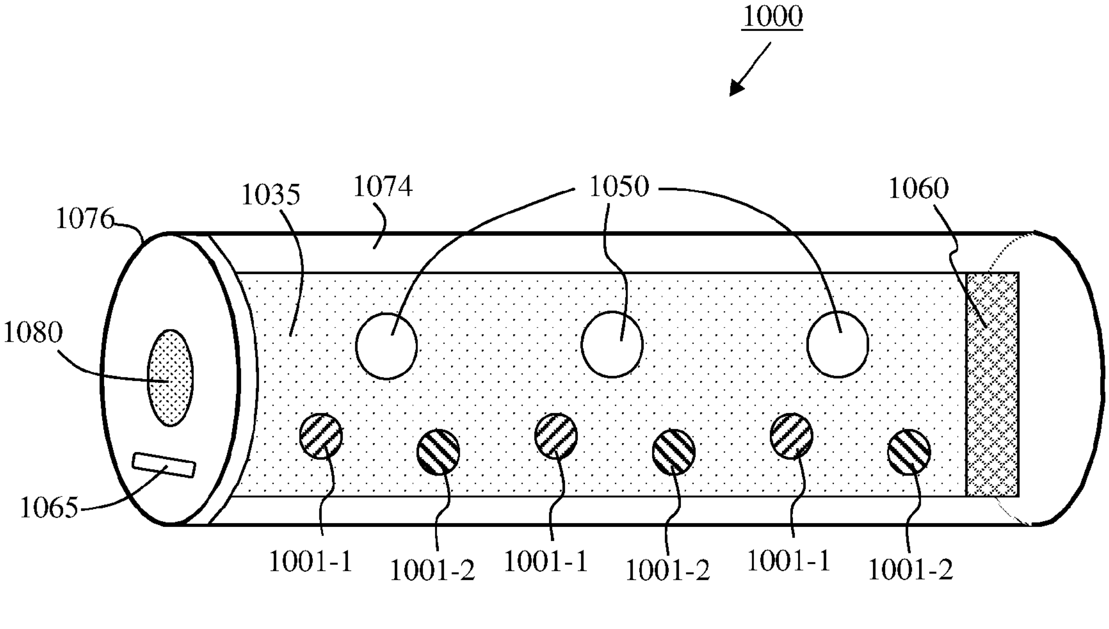
FIG. 10 is a perspective view of a non-limiting example of a throwable illumination system according to some embodiments.

FIG. 10 is a perspective view of a non-limiting example of a throwable illumination system according to some embodiments. Illumination system 1000 may include broadband illumination sources 1050, a set of first narrow-band light sources 1001-1 that generate one or more HILBs having a first color, and a set of second narrow-band light sources 1001-2 that generate one or more HILBs having a second color. Although not shown for clarity, the illumination system may include any of the components and features described elsewhere such as a power source, a controller, and optical elements or other features for producing Modified HILBs.

Illumination system 1000 may include housing body 1074 that may optionally be tubular and tail cap 1076 on at least one end of the housing body. The tail cap 1076 may optionally include a switch 1080 and charging port 1065. In some embodiments, the broadband illumination sources and the narrow-band light sources may be provided inside the housing body on substrate 1035. In some cases, the substrate may be a printed circuit board. The illumination system may further include a sound element 1065 (optionally provided on platform 1035) for producing a loud noise that may further distract, disorient, or otherwise disrupt a threat or intruder. The housing body 1074 or at least a portion thereof may be made from a transparent material to allow transmission of broadband and narrow-band light. The housing body 1074 may be formed of a rugged material (for example, clear plastic) that can withstand forces it may experience when thrown or physically projected.

In some cases, a person may press the switch 1080 to activate the illumination system and then throw the illumination system 1000 into a ZOD. In some embodiments, activation of the illumination system may include a time delay so that the various lights (broadband and/or narrow band) and/or sound element do not switch on until after the illumination system has been physically projected into the ZOD.

Figure 11A:
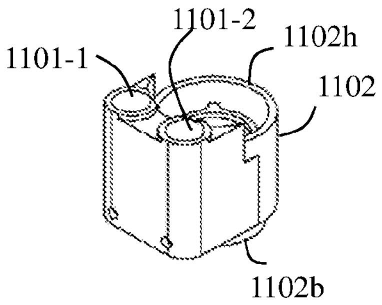
FIGS. 11A and 11B illustrate a non-limiting example of using a modular attachment to form an illumination system according to some embodiments.
Figure 11B:
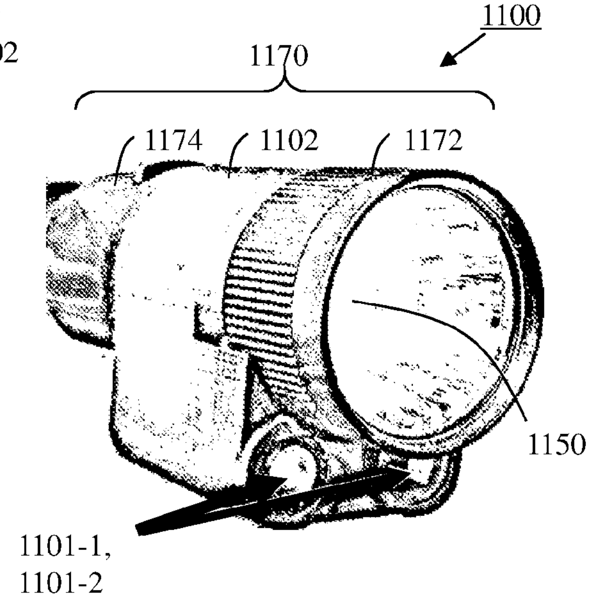

In some embodiments, an imaging disruption device may be provided within its own housing as a modular attachment that couples with a head assembly and/or a body assembly to form the illumination system. FIGS. 11A and 11B illustrate a non-limiting example of using a modular attachment to form an illumination system according to some embodiments. FIG. 11A is a perspective view of secondary housing 1102 which may be referred to herein as a modular attachment. The modular attachment includes imaging disruption devices or assemblies 1101-1 and 1101-2. In some embodiments, the imaging disruption assemblies may each include a laser, LED or other narrow-band light source together with some form of a light modifying assembly (such as an OE or the like). The modular attachment may include an end **1102*h* that interfaces with a head assembly and an end 1102*b* that interfaces with a body assembly. Although not shown in FIG. 11A, the modular attachment may include threads or other mechanical means for securing it to the head or body assemblies. FIG. 11B is a perspective view of illumination system 1100 including secondary housing (modular attachment) 1102, provided between head assembly 1172 (which includes broadband illumination source 1150) and body assembly 1174 (only a portion of which is shown). Collectively, the head assembly, modular attachment, and body assembly form housing 1170. The imaging disruption devices may in some cases be connected to the same power source or controller as the broadband illumination source 1150**, but alternatively, it may be connected to a different power source or controller.

Figure 12:
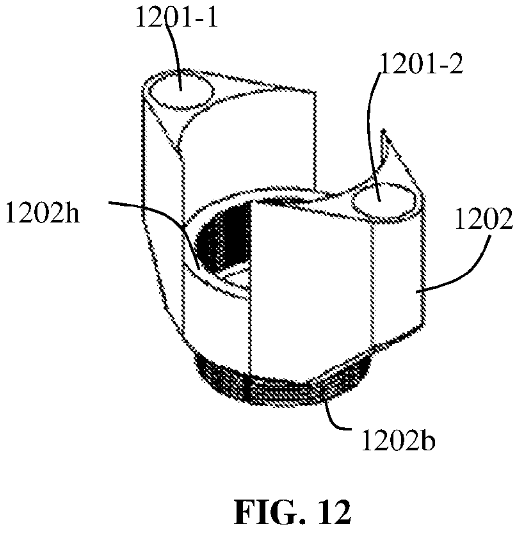
FIG. 12 illustrates a non-limiting example of a modular attachment according to some embodiments.
Figure 13:
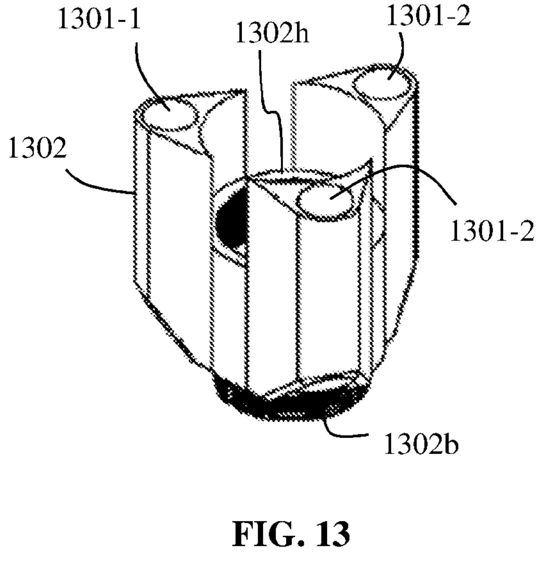
FIG. 13 illustrates a non-limiting example of a modular attachment according to some embodiments.

FIGS. 12 and 13 illustrate additional non-limiting examples of modular attachments according to some embodiments. FIG. 12 is a perspective view of secondary housing (modular attachment) 1202. The modular attachment includes slots or holding elements for the imaging disruption assemblies 1201-1 and 1201-2. In some embodiments, the slots or holding elements may each include a narrow-band light source (e.g., a laser, LED, or the like) together with some form of an light modifying assembly (such as an OE, etc.). The modular attachment may include an end **1202*h* that interfaces with a head assembly and an end 1202*b*** that interfaces with a body assembly. The modular attachment may optionally include threads or other securing means for such interfacing.

Similarly, FIG. 13 is a perspective view of secondary housing (modular attachment) 1302. The modular attachment includes three imaging disruption assemblies 1301-1, 1301-2, 1301-3 (for example, a laser source and an OE, or any other combination of narrowband light source and light modifying assembly). The modular attachment may include an end **1302*h* that interfaces with a head assembly and an end 1302*b*** that interfaces with a body assembly. The modular attachment may optionally include threads or other attachment means for such interfacing.

Additional Imaging Disruption Device Considerations and Properties

In some embodiments, the imaging disruption device may be able to deter threats in one or more ZODs of various sizes, positions and distances. A ZOD may be as close as a few centimeters from the imaging disruption device or up to several kilometers away, depending upon the properties of the beam array of light and the nature of the threat. In some cases, the areas or volumes of multiple ZODs may partially or fully overlap. For example, a first MHLIB or beam array may be projected into a first ZOD to deter a first threat, e.g. a hostile person, and a second MHLIB or beam array may be projected into a second ZOD that partially or fully overlaps with the first ZOD to deter a second threat, e.g., a hostile vehicle. The properties of the beam arrays may need to be different to handle different threats in overlapping ZODs. For example, the second MHLIB or beam array may be intended to deter a target that the first MHLIB or beam array failed to deter, but with increased deterrence features (e.g., the intensity or irradiance of the beam array radiation).

The imaging disruption device may be combined with other deterrent technologies that may be used to deter or stop threats. Such other deterrent technologies may include strobe lights, acoustic devices (e.g., to cause a loud sound to disorient an intruder or which may cause pupillary dilation and thus increase a target person's vulnerability to the imaging disruption system), non-lethal weapons (e.g., pepper spray, tasers, tear gas . . . etc.), or even lethal weapons (e.g., mounted on a weapon).

Target Considerations

In order to deter or stop an intruding threat in a ZOD, the corresponding beam array operates to supply sufficient energy to distract or disrupt the targeted imaging system (biological or electronic), i.e., to achieve the desired Effective Disruption. In this section, reference to a "target" refers to the light gathering portion of the imaging system. The level of disruption should be sufficient to at least cause the threat to pause, slow or become disoriented. In general, the energy required to cause Effective Disruption will be function of the target itself, the desired level of disruption, the radiation wavelength of the array light elements reaching the target, the radiation intensity of each array light element reaching the target, and the integrated time that the array light element spends irradiating the target. The disruption energy may further be a function of the motion of the target (moving in and out of the MHLIB or beam array light elements) or motion of the beam array itself. Faster motion may cause more "hits" of the MHLIB or beam array with the target, but each hit may be shorter in time, so there are numerous combinations of movement and BE power/irradiance that may achieve the desired disruption. Additional considerations may relate to whether the target is protected in some way by light filters or eyewear.

Delivering an MHILB or beam array having proper intensity of radiation or irradiance to the ZOD is further a function of the distance from the imaging disruption system, the intensity and irradiance of the HILB, properties of the OE, system optical losses, the beam array pattern, pattern divergence, array light element beam divergence, power drop-off as a function of distance, and radiation absorption or dispersion by intervening atmospheric materials and particles. In some embodiments, the imaging disruption system When the imaging system target is a biological visual system of a person or animal, the MHLIB properties may in some embodiments be selected not to permanently damage the intruder's eye. Such considerations are discussed in detail in WO2019222723, which is incorporated by reference herein for all purposes. However, it is useful to discuss some of the various visual disruption factors and phenomena that may be associated with the visual system.

Visual Disruption Factors

"Visual disruption" or "Effective Disruption", as used herein, means any disruption of vision that can inhibit, complicate, or interfere with functional vision, and/or make target identification or localization more difficult, through the introduction of intense light in the field of view. Visual disruption includes photophobia or photosensitivity as visual discomfort and aversion, glare, flash blindness, startle and/or distraction. In some cases, the visual disruption may include disrupted binocular vision.

A fundamental function of the retina is to achieve clarity of visual images of objects. The retina processes light through a layer of photoreceptors. When an exposed light source is present in the field of view, the visibility of neighboring objects is disrupted due to the visual effects of laser exposure. Distraction/startle, glare/disruption, and flash blindness are all transitory visual effects associated with laser exposure.

"Photophobia" (discomfort and aversion) refers to a sensory disturbance provoked by light. The term "photophobia" (derived from the Greek words "photo" meaning "light" and "phobia" meaning "fear") means, literally, "fear of light" and is a sensory state of light-induced ocular or cranial discomfort, and/or subsequent tearing and squinting.

"Distraction" occurs when an unexpected bright light (e.g., laser or other bright light) distracts a person from performing certain tasks. A secondary effect may be "startle" or "fear" reactions.

"Glare" (sometimes called "dazzle") refers to the temporary inability to see detail in the area of the visual field around a bright light (such as an oncoming car's headlights). Glare is not associated with biological damage. It lasts only as long as the bright light is actually present within the individual's field of vision. Laser glare can be more intense than solar glare and in dark surroundings, even low levels of laser light may cause significant inconvenient glare. Glare that disrupts vision is called disability glare. A subtype of glare, "disability glare" is primarily caused by the diffractions and scattering of light inside the eye due to the imperfect transparency of the optical components of the eye and to a lesser extent by diffuse light passing through the scleral wall or the iris. The scattered light overlays the retinal image, thus reducing visual contrast. This overlaying scattered light distribution is usually described as a veiling luminance.

"Flash blindness" is a temporary visual loss following a brief exposure to an abrupt increase in the brightness of all or part of the field of view, similar in effect to having the eyes exposed to a camera flashlight. It is a temporary loss of vision produced when retinal light-sensitive pigments are bleached by light more intense than that to which the retina is physiologically adapted at that moment. An "afterimage", which moves with the eye, persists for several seconds to several minutes after the light source is turned off. This afterimage produces a temporary scotoma (blind spot) in the visual field in which targets are either partially or completely obscured. The time required for temporary flash blindness-induced scotomas to fade increases with the brightness and duration of the light insult. The time it takes before the ability to perceive targets returns depends on several factors, including target contrast, brightness, color, size, observer age, and the overall adaptation state of the visual system. Typically, complete dark adaptation of the visual system takes longer, e.g., 20 to 30 minutes, whereas adaptation to an environment of bright light is usually faster, e.g., completed within 2 minutes. So, under scotopic conditions (low light level or nighttime light levels), flash blindness will be most drastic and easiest to achieve.

"Disrupted binocular vision" may include visual disturbances that are the result of different optical stimuli (color, pattern, intensity, or a combination) in each eye. In some cases, the dissimilar stimuli cause confusion or headaches. For example, exposing one eye to red light and the other eye to blue light (or some other set of differing colors) may result in a discomfort or confusion over and above the disturbance caused in each eye individually. In some cases, disrupted binocular vision may include a distortion of depth perception such as by chromostereopsis. For example, a red image in one eye and a blue image in the other may be perceived as having different distances, thereby confusing or disorienting the person. Alternatively, projecting mismatched patterns or images in each eye (whether the colors are the same or different) may confuse a person, e.g., by making it difficult to properly focus.

The imaging disruption device of the present disclosure may cause one or more of the visual disruptions described above to deter threats in a ZOD. It is a natural human reaction to blink when the eye is confronted with high intensity radiation. In addition to relative motion of a target to the beam array, this blinking may limit the total exposure time, e.g., to about 250 msec. In some embodiments where the target is a human visual system, the irradiance of the array light elements in the ZOD is less than 100 mW/cm$^2$, alternatively less than 50 mW/cm$^2$, alternatively less than 5 mW/cm$^2$, or alternatively less than 1 mW/cm$^2$. Such intensities may not cause permanent damage. However, if the human target is not deterred, in some embodiments, the power/irradiance or intensity of the light may be increased well beyond these values, even at the expense of permanent eye damage.

Electronic Imaging System Targets

For electronic imaging systems the target may be a camera sensor (e.g., CCD, CMOS) or some other sensor. For such systems, the disruption energy may be sufficient to temporarily overload or otherwise make the electronic sensor have a degraded or inaccurate signal, rendering it useless for a period of time. In some embodiments, the disruption energy may be sufficient to permanently damage the sensor on a target. In some embodiments, in order to disrupt or permanently damage the sensor, the irradiance of the array light elements may be greater than that used to cause temporary visual disruption.

Communication Ecosystem

In some embodiments, the portable illumination system may be characterized as a smart device that is capable of communicating with other devices and/or includes programming that allows it to operate at least partially autonomously based on input data received from onboard sensors or other internal or external devices.

Figure 14:
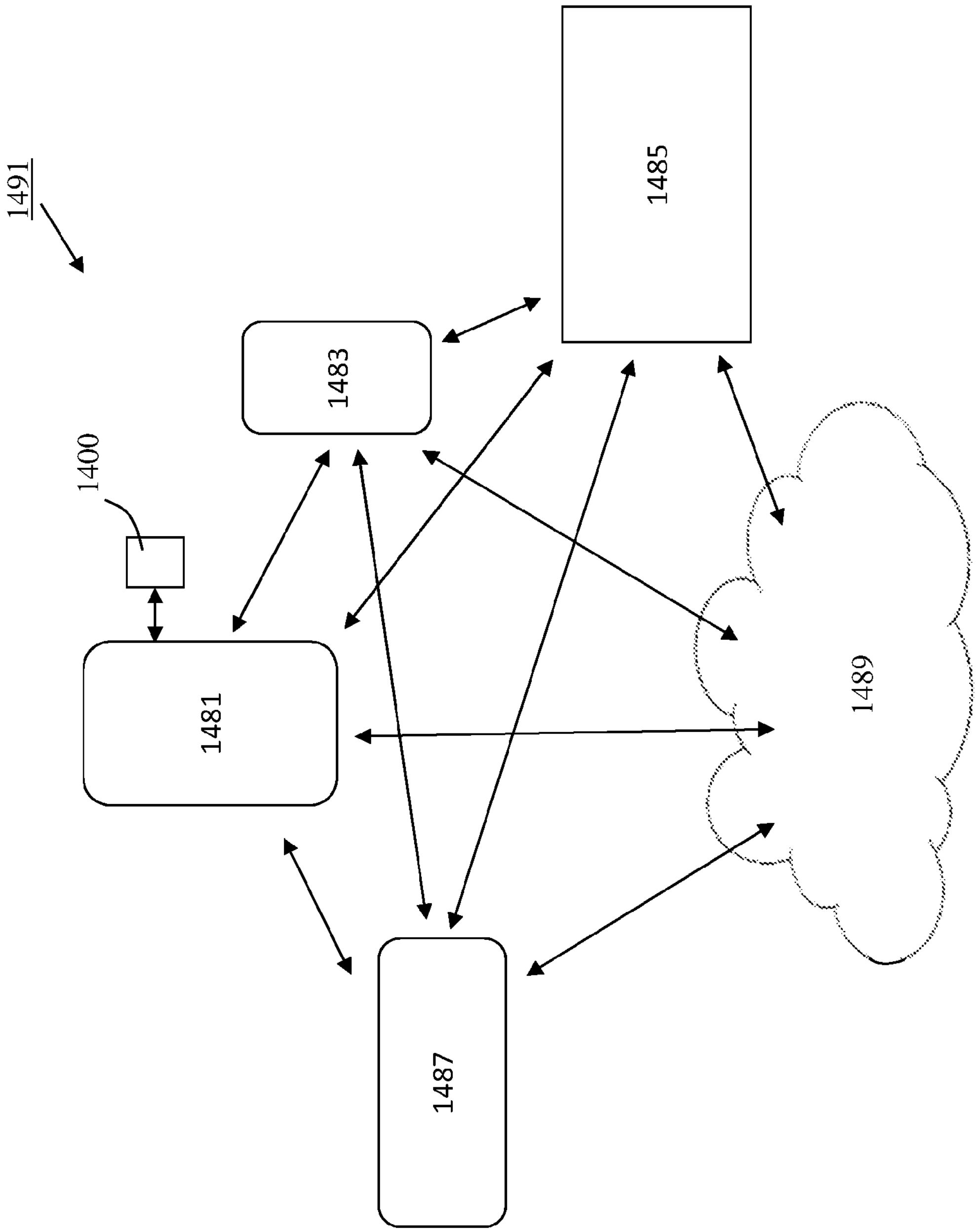
FIG. 14 is a schematic of a non-limiting example of an electronic communication system or network in which the illumination system may be operated according to some embodiments.

FIG. 14 is a schematic of a non-limiting example of an electronic communication system or network in which the illumination system may be operated according to some embodiments. Electronic communication network 1491 includes a user 1481 operating an illumination system 1400. In some cases, the user may be a security guard, a law enforcement officer, a member of the military, a covert operations specialist, or the like. The network may optionally include a colleague 1483 of user 1481. The colleague may work with the user in some way as an ally, partner, team member, or the like. Network 1491 may optionally include a primary facility that may be associated with the user, e.g., a police station, headquarters, an employer's office, a military base, a home, or the like. The network 1491 may optionally include a user's vehicle 1487, e.g., a police cruiser, a military vehicle, an ATV, an automobile or truck, a bicycle, a motor bike, or the like. The network 1491 may optionally include cloud infrastructure 1489 which may include internet-based computers, networks, data storage, software, and the like. The cloud infrastructure 1489 may further allow access and communications to additional resources not shown here.

Each element of network 1491 includes or carries some kind of electronic communication device capable of receiving information, transmitting information, or both. The arrows in FIG. 14 show some non-limiting examples of communication between elements. Note that arrows directed to user 1481 from colleague 1483, primary facility 1485, vehicle 1487, or cloud infrastructure 1489, may instead (or addition) be directed to illumination system 1400. In some embodiments, the electronic communication technology used may include, but is not limited to, infrared, RFID, Wi-Fi, Ethernet, Broadband, Bluetooth, near-field communication (NFC), fiber optic, laser-based, cellular radio, satellite, emergency broadcasting systems (e.g., transmitting using the Emergency Priority Transmission protocol that all national wireless carriers offer), other radio communications (including but not limited to wireless communication protocols that may include 900 MHZ, Zigbee, and Z-wave), or any other kind of communication technology suitable for sending or receiving information between two devices.

In a non-limiting example, a wireless network connection refers to any type of communication system where two devices communicate with each other without use of a direct wired connection. Wireless networks may include cell phone or cellular networks, wireless local area networks (WLANs), wireless sensor networks, Wi-Fi, Bluetooth, near-field communication (NFC), satellite communication networks, radio (e.g., 900 MHz, Zigbee, and Z-wave), spread spectrum technologies, IoT technologies, free-space optical communication, terrestrial microwave networks, or the like.

Each electronic communication device (or other devices associated with each network element) may include or be associated with a computer processor (e.g., microprocessor). The computer processor along with an associated memory, provides a means for performing any method as set out herein, and a (tangible (e.g., non-transitory)) computer-readable medium comprising software code adapted, when executed on a data processing apparatus, that may perform any method as set out herein.

In some embodiments, user 1481 may carry or wear additional user electronic devices (in addition an electronic communication device) that may be in network communication with the illumination system or other network elements. For example, the user may carry or wear a body cam, augmented reality glasses, a headset, a weapon, or the like. In some embodiments, information or data from the user electronic devices, the illumination system (e.g., obtained from one of the additional components), or both, may be analyzed locally or via the network to assess threats, identify objects (which may include facial recognition), activate, or unlock the imaging disruption device, or some other use. For example, while interacting with a person of interest, the user's body cam or a camera on the illumination system may send images of the person via the network which are analyzed for facial recognition. A person's identity may be communicated back to the user. If the person of interest has been flagged as a threat (e.g., is a wanted criminal or terrorist), such threat may be communicated to the user by any number of methods. For example, a display, an indicator light, or haptic feedback on the illumination system may signal the threat. Data from the illumination system or the user's electronic devices may be stored for later analysis.

In some embodiments, rather than an image, a sound (e.g., from a gunshot, yell, struggle) may activate or unlock the imaging disruption device, cause a message to be automatically sent to the network requesting assistance, or otherwise activate some component of the illumination system or element network.

In some embodiments, one or more additional components may sense that the illumination device has been dropped which may initiate a distress beacon or message.

In some embodiments, one or more sensors of the imaging disruption device or sensors associated with another network element may detect the presence of a person, drone, vehicle, robot . . . etc., in a ZOD and used as a trigger to activate the appropriate beam array. In some cases, upon activation, the imaging disruption system runs a predetermined program for operation and projection of the MHILB or beam array into the ZOD. In some cases, the imaging disruption system may receive additional information from sensors or tracking devices that cause some change to the beam array properties (direction, irradiance, intensity, divergence, movement . . . etc.) to deter the target more effectively.

ENUMERATED EMBODIMENTS

Still further aspects herein include the following enumerated embodiments.

1. A multifunction portable illumination system including:
a housing including a power source;
a broadband illumination source connected to the power source and capable of producing broadband illuminating light; and
an imaging disruption assembly including at least one narrow-band light source capable of generating one or more high intensity light beams (HILB) and a light modifying assembly configured to modify the one or more HILB to produce a Modified HILB;
wherein at least one Modified HILB has the requisite irradiance to cause disruption of an imaging system.

2 The illumination system according to embodiment 1, wherein the light modifying assembly includes an optical element (OE).

3. The illumination system according to embodiment 2, wherein the optical element (OE) is chosen from: a divergence-modifying OE, a multibeam OE or a light redirection OE.

4. The illumination system according to embodiment 3, wherein the multibeam OE includes a diffractive OE or a microlens array OE.

5. The illumination system according to embodiment 3 or 4, wherein the multibeam OE includes active control elements for directing light in a specific direction.

6. The illumination system according to any of embodiments 1-5, wherein the light modifying assembly acts on the one or more high intensity light beams (HILB) to produce a first Beam Array of disruptive light.

7. The illumination system of embodiment 6, wherein the Beam Array of disruptive light includes visible light having a wavelength bandwidth of less than 100 nm.

8. The illumination system of any of embodiments 1-7, wherein the at least one narrow-band light source includes a laser, a light emitting diode, a surface-mounted diode, a super-luminescent diode, or a combination thereof.

9. The illumination system according to any of embodiments 1-8, wherein the light modifying assembly includes a motion element.

10. The illumination system according to embodiment 6, wherein said first beam array is a temporal beam array or a multi-beam beam array.

11. The illumination system according to embodiment 10, wherein the properties of the first beam array are selected to disrupt the human visual system.

12. The illumination system according to embodiment 10, wherein the properties of the first beam array are selected to disrupt an electronic imaging system.

13. The illumination system according to any of embodiments 1-12, wherein the imaging disruption device further includes a second narrow band light source or a second light modifying assembly or both for producing a second Modified HILB.

14. The illumination system according to embodiment 13, wherein the second Modified HILB is chosen from:

i) a visible light having a color that is different than the first Modified HILB;

ii) an infra-red light having a peak wavelength in a range of 700-3000 nm;

iii) an ultraviolet light having a peak wavelength in a range of 300-400 nm; or iv) any binary or ternary combination of (i) through (iii).

15. The illumination system of embodiment 13 or 14, wherein the first Modified HILB includes a first beam array having a first pattern, and wherein the second Modified HILB includes a second beam array having a second pattern that is different from the first pattern.

16. The illumination system according to any of embodiments 13-15, wherein the first and second narrow-band light sources are individually selected to produce violet, blue, cyan, green, yellow, orange, or red light.

17. The illumination system of embodiment 16, wherein the first narrow-band light source produces green light, and the second narrow-band light source produces red light.

18. The illumination system according to any of embodiments 13-17, wherein the wherein the first and second Modified HILBs are pulsed in a preprogrammed sequence.

19. The illumination system of embodiment 18, wherein the first MHILB and the second MHILB are characterized by a first pulse profile and a second pulse profile, respectively.

20. The illumination system of embodiment 19, wherein the first pulse profile is different from the second pulse profile with respect to at least one of: on/off time, duty cycle, or frequency.

21. The illumination system of embodiment 19 or 20, wherein at least one pulse profile is characterized by a frequency in a range of 1 to 30 Hz.

22. The illumination system according to any of embodiments 18-21, wherein the pulse sequence includes alternating between the first and second MHILB such that during operation the first MHILB is not on while the second MHILB is on.

23. The illumination system according to any of embodiments 18-22, wherein the pulse sequence includes partially alternating between the first and second MHILB, such that during operation the first MHILB is on for a portion of a time that the second MHILB is on.

24. The illumination system according to any of embodiments 1-23, wherein the broadband illumination source produces non-coherent visible light having a bandwidth of at least 100 nm.

25. The illumination system according to any of embodiments 1-24, wherein the broadband illumination source includes an incandescent lamp, a halogen lamp, a fluorescent lamp, a xenon lamp, an LED, a superluminescent diode, or an LED- or laser-pumped phosphor.

26. The illumination system according to any of embodiments 1-25, further including at least one optical component that acts on the illumination light to shape, focus, redirect, adjust the brightness, or alter the color of the illumination light.

27. The illumination system according to any of embodiments 1-26, wherein the imaging disruption device is connected to the same power source as the broadband illumination source or to a different power source.

28. The illumination system according to any of embodiments 1-27, wherein the power source includes a rechargeable battery.

29. The illumination system according to any of embodiments 1-28, further including at least one controller for at least partially controlling the operation of the imaging disruption device, the broadband illumination source, or an additional component, or any combination thereof.

30. The illumination source of embodiment 29, wherein the controller includes a logic circuitry, memory, software, firmware, connectors for interfacing with controlled components, or a power source connector, or any combination thereof.

31. The illumination system according to embodiments 29 or 30, further including a second controller, wherein one controller controls the broadband illumination source and another controller controls the imaging disruption device.

32. The illumination system according to any of embodiments 1-31, further including at least one additional component selected from a sensor, a camera, a microphone, a speaker, a wireless communication device, a USB port, an information display, an accelerometer, a magnetometer, a gyroscope, a GPS, a status indicator or icon, an LED, a light sensor, a proximity sensor, a range detector, a thermal imaging device, a movement sensor, a LiDAR module, a radar module, a proximity sensor, a haptic feedback device, a biometric sensor, a moisture sensor, a pressure sensor, an infrared light source, a laser pointer, a taser, a spray device, a lighter, a distress beacon, or a illumination system.

33. The illumination system according to any of embodiments 1-32, wherein the housing includes a modular attachment that houses at least a portion of at least one imaging disruption device.

34. The illumination system according to any of embodiments 1-33, wherein the illumination system is designed to be hand-held, weapon-mounted, wearable on a person, mountable on a vehicle, sea vessel, aircraft or drone, mountable on a portable stand, or any combination thereof.

35. The illumination system according to any of embodiments 1-34, wherein the housing further includes one or more switches for operating the broadband illumination source, the imaging disruption device, or an additional component, or any combination thereof.

36. The illumination system of embodiment 35, wherein the at least one switch includes a knob, a dial, a slidable button, a push button, a toggle, a ring, or a trigger, or any combination thereof.

37. The illumination system of embodiment 35 or 36, wherein the at least one switch is used to provide one or more of the following operations:

a) turn on the illumination source at a low brightness;
b) turn on the illumination source at a high brightness;
c) turn on a first high-intensity light source in a steady mode;
d) turn on a second high-intensity light source in a steady mode;
e) turn on a first or second high-intensity light source, or both, to pulse in a preprogrammed pulse sequence; or
f) change a preprogrammed pulse sequence to a different sequence.

38. The illumination system according to any of embodiment 35-37, wherein the at least one switch includes a button that is pressed and toggles between operational states based on i) the number of presses, ii) the duration of a press, iii) the time spacing between presses, iv) the force of the press, or v) any combination of (i)-(iv)

39. The illumination system of according to any of embodiments 1-38, wherein the housing includes a cylindrical body assembly having a first switch on a wall of the body assembly and a second switch on an endcap of the body assembly.

40. The illumination system of embodiment 39, wherein the first and second switches operate to control the illumination system in the same way.

41. The illumination system according to any of embodiments 1-40, wherein the broadband illumination source, the imaging disruption device, or an additional component, or a combination thereof, may be controlled at least in part by voice activation or remotely by wireless communication.

42. The illumination system according to any of embodiments 1-41, wherein the Modified HILB is projected into a Zone of Disruption (ZOD).

43. A method of operating a multifunction portable illumination system, the method including:

a) providing a multifunction portable illumination system including:
   a housing including a power source;
   a broadband illumination source connected to the power source and capable of producing broadband illuminating light; and
   an imaging disruption assembly including at least one narrow-band light source capable of generating one or more high intensity light beams (HILB) and a light modifying assembly configured to modify the one or more HILB to produce a Modified HILB;
b) establishing a wireless data communication link between the illumination system and a second device; and
c) sending data (i) from the illumination system to the second device, or (ii) from the second device to the illumination system, or both (i) and (ii).

44. The method of embodiment 43, wherein the Modified HILB includes a beam array.

45. The method of embodiment 43 or 44, further including projecting the Modified HILB into a ZOD.

46. A multifunction portable illumination system including:

a housing including a power source and at least one controller;
a broadband illumination source connected to the power source and capable of producing broadband illuminating light having a bandwidth of at least 100 nm;
a first narrow-band light source capable of generating a first high intensity light beam (HILB) having a bandwidth of less than 100 nm;
a second narrow-band light source capable of generating a second HILB having a bandwidth of less than 100 nm; and
a light modifying assembly configured to modify the first and second HILBs to produce first and second Modified HILBs (MHILBs), wherein the first and second MHILBs are pulsed in a preprogrammed sequence.

47. The illumination system of embodiment 46, wherein the light modifying assembly includes a divergence-modifying optical element (DMOE).

48. The illumination system of embodiment 47, wherein the DMOE includes a reflective structure.

49. The illumination system of embodiment 47 or 48, wherein the DMOE includes a lens.

50. The illumination system according to any of embodiments 46-49, wherein the broadband illumination source, the first narrow-band light source, and the second narrow-band light source are co-located.

51. The illumination system of embodiment 50, wherein the light modifying assembly also acts on the broadband illuminating light.

52. The illumination system according to any of embodiments 46-51, wherein the first narrow-band light source includes a first LED or laser.

53. The illumination system according to any of embodiments 46-52, wherein the second narrow-band light source includes a second LED or laser.

54. The illumination system according to any of embodiments 46-53, wherein the first HILB is characterized by a first peak wavelength that is spaced at least 30 nm from a peak wavelength of the second HILB.

55. The illumination system of embodiment 54, wherein the first and second narrow-band light sources are individually selected to produce violet, blue, cyan, green, yellow, orange, or red light.

56. The illumination system of embodiment 55, wherein the first narrow-band light source produces green light, and the second narrow-band light source produces red light.

57. The illumination system according to any of embodiments 46-56, wherein the first MHILB and the second MHILB are characterized by a first pulse profile and a second pulse profile, respectively.

58. The illumination system of embodiment 57, wherein the first pulse profile is different from the second pulse profile with respect to at least one of: on/off time, duty cycle, or frequency.

59. The illumination system of embodiment 57 or 58, wherein at least one pulse profile is characterized by a frequency in a range of 1 to 15 Hz.

60. The illumination system according to any of embodiments 46-59, wherein the pulse sequence includes alternating between the first and second MHILBs such that during operation the first MHILB is not on while the second MHILB is on.

61. The illumination system according to any of embodiments 46-60, wherein the pulse sequence includes partially alternating between the first and second MHILBs, such that during operation the first MHILB is on for a portion of a time that the second MHILB is on.

62. The illumination system according to any of embodiments 46-61, wherein the illumination light is on while the first and second MHILBs are pulsed.

63. The illumination system according to any of embodiments 46-61, wherein the illumination light is off while the first and second MHILBs are pulsed.

64. The illumination system according to any of embodiments 46-63 further including at least one switch connected to the controller, wherein the at least one switch includes a physical switch, an electronic switch, or a wirelessly operated switch.

65. The illumination system of embodiment 64, wherein the at least one switch is used to provide one or more of the following operations:

a) turn on the illumination source at a low brightness;
b) turn on the illumination source at a high brightness;
c) turn on the first narrow-band light source in a steady mode;
d) turn on the second narrow-band light source in a steady mode;
e) turn on the first and second narrow-band light sources to pulse in the preprogrammed pulse sequence; or
f) change the preprogrammed pulse sequence to a different sequence.

66. The illumination system of embodiment 63 or 64, wherein the at least one switch toggles between operational states.

67. The illumination system of embodiment 66, wherein the at least one switch includes a button that is pressed and toggles between operational states based on i) the number of presses, ii) the duration of a press, iii) the time spacing between presses, iv) the force of the press, or v) any combination of (i)-(iv).

68. The illumination system of embodiment 66 or 67, wherein the at least one switch activates the preprogrammed sequence when pressed and held for a hold duration time X, wherein X is in a range of 0.5 to 4.0 seconds.

69. The illumination system of according to any of embodiments 46-68, wherein the housing includes a cylindrical body assembly having a first switch on a wall of the body assembly and a second switch on an endcap of the body assembly.

70. The illumination system of embodiment 69, wherein the first and second physical switches operate to control the illumination system in the same way.

71. The illumination system according to any of embodiments 46-70, wherein the first and second narrow-band light sources are included in an imaging disruption assembly.

72. The illumination system according to any of embodiments 46-71, wherein the pulsed first and second MHILBs have the requisite irradiance to cause disruption of the human visual system.

73. The illumination system according to any of embodiments 46-72, wherein the pulsed first and second MHILBs have the requisite irradiance to cause disruption of an imaging system.

74. The illumination system according to any of embodiments 46-73, wherein the broadband illumination source includes an incandescent lamp, a halogen lamp, a fluorescent lamp, a xenon lamp, an LED, a superluminescent diode, or an LED- or laser-pumped phosphor.

75. The illumination system according to any of embodiments 46-74, wherein the power source includes a rechargeable battery.

76. The illumination source according to any of embodiments 46-75, wherein the controller includes a logic circuitry, memory, software, firmware, connectors for interfacing with controlled components, or a power source connector, or any combination thereof.

77. The illumination system according to any of embodiments 46-76, further including a second controller, wherein one controller controls the broadband illumination source and another controller controls the narrow-band light sources.

78. The illumination system according to any of embodiments 46-77, further including at least one additional component selected from a sensor, a camera, a microphone, a speaker, a wireless communication device, a USB port, an information display, an accelerometer, a magnetometer, a gyroscope, a GPS, a status indicator or icon, an LED, a light sensor, a proximity sensor, a range detector, a thermal imaging device, a movement sensor, a LiDAR module, a radar module, a proximity sensor, a haptic feedback device, a biometric sensor, a moisture sensor, a pressure sensor, an infrared light source, a laser pointer, a taser, a spray device, a lighter, a distress beacon, or a illumination system.

79. The illumination system according to any of embodiments 46-78, wherein the first and second MHILBs are projected into a Zone of Disruption (ZOD).

80. A method of using the multifunction illumination system according to any of emboiments 1-42 or 46-77, the method comprising physically projecting the illumination system into a ZOD.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

What is claimed is:

1. A multifunction portable illumination system comprising:

a housing comprising a power source;

a broadband illumination source connected to the power source and capable of producing broadband illuminating light; and an imaging disruption assembly comprising at least two narrow-band light sources capable of generating two or more high intensity light beams (HILB) and a light modifying assembly configured to modify the two or more HILB to produce at least a first and a second Modified HILB;

wherein the HILB does not include a laser beam, wherein each Modified HILB has the requisite irradiance to cause disruption of an imaging system, and wherein the first and second Modified HILBs are pulsed in a preprogrammed sequence characterized by a first pulse profile and a second pulse profile, respectively.

2. The illumination system of claim 1, wherein the light modifying assembly comprises an optical element (OE).

3. The illumination system of claim 2, wherein the optical element (OE) is chosen from: a divergence-modifying OE, a multibeam OE or a light redirection OE.

4. The illumination system of claim 3, wherein the multibeam OE comprises a diffractive OE or a microlens array OE.

5. The illumination system of claim 3, wherein the multibeam OE comprises active control elements for directing light in a specific direction.

6. The illumination system of claim 1, wherein the light modifying assembly acts on the high intensity light beams (HILB) to produce a first Beam Array of disruptive light, wherein the Beam Array of disruptive light comprises light having a wavelength bandwidth of less than 100 nm and is selected from (i) visible light having a peak wavelength in a range of 400-700 nm, (ii) infrared light having a peak wavelength in a range of 700-1600 nm, (iii) infrared light having a peak wavelength in a range of 1600-3000 nm, or (iv) ultraviolet light having a peak wavelength in a range of 300-400 nm.

7. The illumination system of claim 1, wherein each of the at least two narrow-band light sources comprise, a light emitting diode, a surface-mounted diode, a super-luminescent diode, or a combination thereof.

8. The illumination system of claim 6, wherein said first beam array is a temporal beam array or a multi-beam beam array.

9. The illumination system of claim 8, wherein the properties of the first beam array are selected to disrupt the human visual system or an electronic imaging system.

10. The illumination system of claim 1, wherein the imaging disruption device further comprises a second light modifying assembly for producing the second Modified HILB.

11. The illumination system of claim 10, wherein the second Modified HILB is chosen from:

i) a visible light having a color that is different than the first Modified HILB;

ii) an infra-red light having a peak wavelength in a range of 700-3000 nm;

iii) an ultraviolet light having a peak wavelength in a range of 300-400 nm; or iv) any combination of (i) through (iii).

12. The illumination system of claim 10, wherein the first Modified HILB comprises a first beam array having a first pattern, and wherein the second Modified HILB comprises a second beam array having a second pattern that is different from the first pattern.

13. The illumination system of claim 1, wherein the first pulse profile is different from the second pulse profile with respect to at least one of: on/off time, duty cycle, or frequency.

14. The illumination system of claim 1, wherein at least one pulse profile is characterized by a frequency in a range of 1 to 30 Hz.

15. The illumination system of claim 1, wherein the pulse sequence comprises alternating between the first and second Modified HILB such that during operation the first Modified HILB is not on while the second Modified HILB is on.

16. The illumination system of claim 1, wherein the pulse sequence comprises partially alternating between the first and second Modified HILB, such that during operation the first Modified HILB is on for a portion of a time that the second Modified HILB is on.

17. The illumination system of claim 1, further comprising at least one optical component that acts on the illumination light to shape, focus, redirect, adjust the brightness, or alter the color of the illumination light.

18. The illumination system of claim 1, further comprising at least one controller for at least partially controlling the operation of the imaging disruption device, the broadband illumination source, or an additional component, or any combination thereof.

19. The illumination system of claim 1, further comprising at least one additional component selected from a sensor, a camera, a microphone, a speaker, a wireless communication device, a USB port, an information display, an accelerometer, a magnetometer, a gyroscope, a GPS, a status indicator or icon, an LED, a light sensor, a proximity sensor, a range detector, a thermal imaging device, a movement sensor, a LiDAR module, a radar module, a proximity sensor, a haptic feedback device, a biometric sensor, a moisture sensor, a pressure sensor, an infrared light source, a laser pointer, a taser, a spray device, a lighter, a distress beacon, or a illumination system.

20. The illumination system of claim 1, wherein the housing comprises a modular attachment that houses at least a portion of at least one imaging disruption device.

21. The illumination system of claim 1, wherein the illumination system is designed to be hand-held, weapon-mounted, wearable on a person, mountable on a vehicle, sea vessel, aircraft or drone, mountable on a portable stand, or any combination thereof.

22. The illumination system of claim 1, wherein the broadband illumination source, the imaging disruption device, or an additional component, or a combination thereof, may be controlled at least in part by voice activation or remotely by wireless communication.

23. The illumination system of claim 10, wherein at least one pulse profile comprises different frequencies or different duty cycles.

24. A method of disrupting an imaging system, the method comprising producing a Modified HILB using the illumination system of claim 1.

25. The illumination system of claim 10, wherein the first narrow-band light source includes a first LED and the second narrow-band light source includes a second LED.

26. The illumination system of claim 10, wherein the first and second narrow-band light sources are individually selected to produce violet, blue, cyan, green, yellow, orange, or red light.

27. The illumination system of claim 26, wherein the first narrow-band light source produces green light, and the second narrow-band light source produces red light.

* * * * *